(12) United States Patent
Liao et al.

(10) Patent No.: US 10,608,278 B2
(45) Date of Patent: Mar. 31, 2020

(54) IN SITU CURRENT COLLECTOR

(71) Applicant: Sion Power Corporation, Tucson, AZ (US)

(72) Inventors: Zhaohui Liao, Tucson, AZ (US); Chariclea Scordilis-Kelley, Tucson, AZ (US); Michael G. Laramie, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 105 days.

(21) Appl. No.: 16/002,097

(22) Filed: Jun. 7, 2018

(65) Prior Publication Data

US 2018/0358651 A1   Dec. 13, 2018

Related U.S. Application Data

(60) Provisional application No. 62/517,409, filed on Jun. 9, 2017.

(51) Int. Cl.
| | |
|---|---|
| *H01M 4/02* | (2006.01) |
| *H01M 10/0525* | (2010.01) |
| *H01M 10/058* | (2010.01) |
| *H01M 4/525* | (2010.01) |
| *H01M 4/505* | (2010.01) |
| *H01M 4/66* | (2006.01) |
| *H01M 10/48* | (2006.01) |
| *H01M 4/485* | (2010.01) |
| *H01M 10/44* | (2006.01) |
| *H01M 4/131* | (2010.01) |

(Continued)

(52) U.S. Cl.
CPC ....... *H01M 10/0525* (2013.01); *H01M 4/131* (2013.01); *H01M 4/134* (2013.01); *H01M 4/405* (2013.01); *H01M 4/485* (2013.01); *H01M 4/505* (2013.01); *H01M 4/525* (2013.01); *H01M 4/661* (2013.01); *H01M 10/058* (2013.01); *H01M 10/446* (2013.01); *H01M 10/48* (2013.01); *H01M 2004/021* (2013.01); *H01M 2004/027* (2013.01); *H01M 2004/028* (2013.01)

(58) Field of Classification Search
CPC ...................................................... H01M 4/02
See application file for complete search history.

(56) References Cited

U.S. PATENT DOCUMENTS

| | | |
|---|---|---|
| 4,330,601 A | 5/1982 | Dey |
| 4,664,991 A | 5/1987 | Perichaud et al. |
| 4,739,018 A | 4/1988 | Armand et al. |

(Continued)

FOREIGN PATENT DOCUMENTS

| | | |
|---|---|---|
| KR | 10-1030406 B1 | 4/2011 |
| WO | WO 99/33125 A1 | 7/1999 |
| WO | WO 99/33130 A1 | 7/1999 |

OTHER PUBLICATIONS

International Search Report and Written Opinion for PCT/US2018/036401 dated Sep. 28, 2018.

(Continued)

*Primary Examiner* — Jacob B Marks
(74) *Attorney, Agent, or Firm* — Wolf, Greenfield & Sacks, P.C.

(57) ABSTRACT

Electrochemical cells comprising electrodes comprising lithium (e.g., in the form of a solid solution with non-lithium metals), from which in situ current collectors may be formed, are generally described.

20 Claims, 4 Drawing Sheets

(51) Int. Cl.
*H01M 4/134* (2010.01)
*H01M 4/40* (2006.01)

(56) References Cited

U.S. PATENT DOCUMENTS

| | | | |
|---|---|---|---|
| 4,833,048 A | 4/1989 | De Jonghe et al. | |
| 4,917,974 A | 4/1990 | De Jonghe et al. | |
| 5,162,175 A | 11/1992 | Visco et al. | |
| 5,194,341 A | 3/1993 | Bagley et al. | |
| 5,278,005 A | 1/1994 | Yamauchi et al. | |
| 5,324,599 A | 6/1994 | Oyama et al. | |
| 5,441,831 A | 8/1995 | Okamoto et al. | |
| 5,516,598 A | 5/1996 | Visco et al. | |
| 5,529,860 A | 6/1996 | Skotheim et al. | |
| 5,538,812 A | 7/1996 | Lee et al. | |
| 5,601,947 A | 2/1997 | Skotheim et al. | |
| 5,648,187 A | 7/1997 | Skotheim | |
| 5,690,702 A | 11/1997 | Skotheim et al. | |
| 5,723,230 A | 3/1998 | Naoi et al. | |
| 5,783,330 A | 7/1998 | Naoi et al. | |
| 5,792,575 A | 8/1998 | Naoi et al. | |
| 5,882,819 A | 3/1999 | Naoi et al. | |
| 5,919,587 A | 7/1999 | Mukherjee et al. | |
| 5,961,672 A | 10/1999 | Skotheim et al. | |
| 6,117,590 A | 9/2000 | Skotheim et al. | |
| 6,153,337 A | 11/2000 | Carlson et al. | |
| 6,201,100 B1 | 3/2001 | Gorkovenko et al. | |
| 6,238,821 B1 | 5/2001 | Mukherjee et al. | |
| 6,306,545 B1 | 10/2001 | Carlson et al. | |
| 6,733,924 B1 | 5/2004 | Skotheim et al. | |
| 6,797,428 B1 | 9/2004 | Skotheim et al. | |
| 6,936,381 B2 | 8/2005 | Skotheim et al. | |
| 7,247,408 B2 | 7/2007 | Skotheim et al. | |
| 7,688,075 B2 | 3/2010 | Kelley et al. | |
| 7,771,870 B2 | 8/2010 | Affinito et al. | |
| 7,785,730 B2 | 8/2010 | Affinito et al. | |
| 7,939,198 B2 | 5/2011 | Mukherjee et al. | |
| 8,076,024 B2 | 12/2011 | Affinito et al. | |
| 8,084,102 B2 | 12/2011 | Affinito | |
| 8,087,309 B2 | 1/2012 | Kelley et al. | |
| 8,105,717 B2 | 1/2012 | Skotheim et al. | |
| 8,197,971 B2 | 6/2012 | Skotheim et al. | |
| 8,264,205 B2 | 9/2012 | Kopera | |
| 8,338,034 B2 | 12/2012 | Affinito et al. | |
| 8,415,054 B2 | 4/2013 | Skotheim et al. | |
| 8,603,680 B2 | 12/2013 | Affinito et al. | |
| 8,617,748 B2 | 12/2013 | Mikhaylik et al. | |
| 8,623,557 B2 | 1/2014 | Skotheim et al. | |
| 8,728,661 B2 | 5/2014 | Skotheim et al. | |
| 8,753,771 B2 | 6/2014 | Skotheim et al. | |
| 8,871,387 B2 | 10/2014 | Wang et al. | |
| 8,936,870 B2 | 1/2015 | Affinito et al. | |
| 8,968,928 B2 | 3/2015 | Wang et al. | |
| 9,005,311 B2 | 4/2015 | Safont et al. | |
| 9,005,809 B2 | 4/2015 | Wilkening et al. | |
| 9,034,421 B2 | 5/2015 | Mikhaylik et al. | |
| 9,040,197 B2 | 5/2015 | Affinito et al. | |
| 9,040,201 B2 | 5/2015 | Affinito et al. | |
| 9,065,149 B2 | 6/2015 | Skotheim et al. | |
| 9,077,041 B2 | 7/2015 | Burnside et al. | |
| 9,105,938 B2 | 8/2015 | Scordilis-Kelley et al. | |
| 9,214,678 B2 | 12/2015 | Mikhaylik | |
| 9,397,342 B2 | 7/2016 | Skotheim et al. | |
| 9,419,274 B2 | 8/2016 | Wilkening et al. | |
| 9,490,478 B2 | 11/2016 | Mikhaylik et al. | |
| 9,531,009 B2 | 12/2016 | Kumaresan et al. | |
| 9,548,492 B2 | 1/2017 | Affinito et al. | |
| 9,559,348 B2 | 1/2017 | Kumaresan et al. | |
| 9,577,243 B2 | 2/2017 | Schmidt et al. | |
| 9,577,267 B2 | 2/2017 | Scordilis-Kelley et al. | |
| 9,653,735 B2 | 5/2017 | Skotheim et al. | |
| 9,653,750 B2 | 5/2017 | Laramie et al. | |
| 9,711,784 B2 | 7/2017 | Kelley et al. | |
| 9,728,768 B2 | 8/2017 | Mikhaylik et al. | |
| 9,735,411 B2 | 8/2017 | Viner et al. | |
| 9,755,268 B2 | 9/2017 | Fleischmann et al. | |
| 9,780,404 B2 | 10/2017 | Scordilis-Kelley et al. | |
| 9,825,328 B2 | 11/2017 | Du et al. | |
| 9,853,287 B2 | 12/2017 | Mikhaylik et al. | |
| 9,947,963 B2 | 4/2018 | Du et al. | |
| 9,994,959 B2 | 6/2018 | Laramie et al. | |
| 9,994,960 B2 | 6/2018 | Laramie et al. | |
| 10,020,479 B2 | 7/2018 | Mikhaylik et al. | |
| 10,020,512 B2 | 7/2018 | Gronwald et al. | |
| 10,050,308 B2 | 8/2018 | Liao et al. | |
| 2005/0196672 A1 | 9/2005 | Mukherjee et al. | |
| 2006/0115579 A1 | 6/2006 | Mukherjee et al. | |
| 2007/0026313 A1* | 2/2007 | Sano | H01M 4/134 429/217 |
| 2007/0221265 A1 | 9/2007 | Affinito et al. | |
| 2008/0318128 A1 | 12/2008 | Simoneau et al. | |
| 2009/0035646 A1 | 2/2009 | Mikhaylik et al. | |
| 2009/0055110 A1 | 2/2009 | Kelley et al. | |
| 2010/0239914 A1 | 9/2010 | Mikhaylik et al. | |
| 2011/0006738 A1 | 1/2011 | Mikhaylik et al. | |
| 2011/0014524 A1 | 1/2011 | Skotheim et al. | |
| 2011/0068001 A1 | 3/2011 | Affinito et al. | |
| 2011/0070491 A1 | 3/2011 | Campbell et al. | |
| 2011/0070494 A1 | 3/2011 | Campbell et al. | |
| 2011/0076560 A1 | 3/2011 | Scordilis-Kelley et al. | |
| 2011/0159376 A1 | 6/2011 | Skotheim et al. | |
| 2011/0165471 A9 | 7/2011 | Skotheim et al. | |
| 2011/0177398 A1 | 7/2011 | Affinito et al. | |
| 2011/0206992 A1 | 8/2011 | Campbell et al. | |
| 2011/0256450 A1 | 10/2011 | Campbell et al. | |
| 2012/0048729 A1 | 3/2012 | Mikhaylik et al. | |
| 2012/0052339 A1 | 3/2012 | Mikhaylik et al. | |
| 2012/0052397 A1 | 3/2012 | Mikhaylik et al. | |
| 2012/0070746 A1 | 3/2012 | Mikhaylik et al. | |
| 2012/0082872 A1 | 4/2012 | Schmidt et al. | |
| 2012/0082901 A1 | 4/2012 | Schmidt et al. | |
| 2012/0315538 A1 | 12/2012 | Chiang et al. | |
| 2013/0164635 A1 | 6/2013 | Schmidt et al. | |
| 2013/0316072 A1 | 11/2013 | Scordilis-Kelley et al. | |
| 2014/0062411 A1 | 3/2014 | Mikhaylik et al. | |
| 2014/0079994 A1 | 3/2014 | Affinito et al. | |
| 2014/0127419 A1 | 5/2014 | Fleischmann et al. | |
| 2014/0127577 A1 | 5/2014 | Fleischmann et al. | |
| 2014/0178776 A1 | 6/2014 | Mitsuoka et al. | |
| 2014/0272565 A1 | 9/2014 | Gronwald et al. | |
| 2014/0272594 A1 | 9/2014 | Safont et al. | |
| 2014/0272595 A1 | 9/2014 | Cristadoro et al. | |
| 2014/0272597 A1 | 9/2014 | Mikhaylik et al. | |
| 2015/0010804 A1 | 1/2015 | Laramie et al. | |
| 2015/0044517 A1 | 2/2015 | Mikhaylik et al. | |
| 2015/0086837 A1 | 3/2015 | Laramie et al. | |
| 2015/0162586 A1 | 6/2015 | Fleischmann et al. | |
| 2015/0180037 A1 | 6/2015 | Gronwald et al. | |
| 2015/0180084 A1 | 6/2015 | Scordilis-Kelley et al. | |
| 2015/0188194 A1 | 7/2015 | Mikhaylik et al. | |
| 2015/0236320 A1 | 8/2015 | Laramie et al. | |
| 2015/0236322 A1 | 8/2015 | Laramie et al. | |
| 2015/0280277 A1 | 10/2015 | Fleischmann et al. | |
| 2015/0287986 A1 | 10/2015 | Affinito et al. | |
| 2015/0287998 A1 | 10/2015 | Scordilis-Kelley et al. | |
| 2015/0303484 A1 | 10/2015 | Iida et al. | |
| 2015/0318539 A1 | 11/2015 | Kelley et al. | |
| 2015/0349310 A1 | 12/2015 | Viner et al. | |
| 2016/0072132 A1 | 3/2016 | Liao et al. | |
| 2016/0118638 A1 | 4/2016 | Gronwald et al. | |
| 2016/0118651 A1 | 4/2016 | Kovalev et al. | |
| 2016/0301080 A1 | 10/2016 | Skotheim et al. | |
| 2016/0344067 A1 | 11/2016 | Laramie et al. | |
| 2017/0018815 A1 | 1/2017 | Laramie et al. | |
| 2017/0047590 A1 | 2/2017 | Mikhaylik et al. | |
| 2017/0141385 A1 | 5/2017 | Scordilis-Kelley et al. | |
| 2017/0141402 A1 | 5/2017 | Affinito et al. | |
| 2017/0141442 A1 | 5/2017 | Mikhaylik et al. | |
| 2017/0149086 A1 | 5/2017 | Du et al. | |
| 2017/0200975 A1 | 7/2017 | Liao et al. | |
| 2017/0250390 A1 | 8/2017 | Laramie et al. | |
| 2017/0288208 A1 | 10/2017 | Kelley et al. | |
| 2017/0338475 A1 | 11/2017 | Laramie et al. | |
| 2017/0352863 A1 | 12/2017 | Mikhaylik et al. | |

(56) References Cited

U.S. PATENT DOCUMENTS

| | | |
|---|---|---|
| 2017/0373321 A1 | 12/2017 | Skotheim et al. |
| 2018/0006303 A1 | 1/2018 | Mikhaylik et al. |
| 2018/0034100 A1 | 2/2018 | Du et al. |
| 2018/0048018 A1 | 2/2018 | Scordilis-Kelley et al. |
| 2018/0138542 A1 | 5/2018 | Bunte et al. |
| 2018/0198162 A1 | 7/2018 | Du et al. |
| 2018/0230610 A1 | 8/2018 | Laramie et al. |

OTHER PUBLICATIONS

Alamgir et al., Lithium Batteries, New Materials, Developments and Perspectives, Chapter 3. Elsevier, Amsterdam. 1994; 93-136.
Dominey, Lithium Batteries, New Materials, Developments and Perspectives, Chapter 4. Elsevier, Amsterdam. 1994; 137-165.

* cited by examiner

IN SITU CURRENT COLLECTOR

RELATED APPLICATIONS

This application claims priority to U.S. Provisional Application No. 62/517,409, filed Jun. 9, 2017, and entitled "In Situ Current Collector," which is incorporated herein by reference in its entirety for all purposes.

TECHNICAL FIELD

Electrochemical cells and methods of forming and using the same are generally described.

BACKGROUND

Electrochemical cells typically include a cathode comprising a cathode active material and an anode comprising an anode active material. The cathode active material and the anode active material can participate in one or more electrochemical reactions, which can be used to generate electrical current.

The anode and the cathode of the electrochemical cell typically include current collectors, which are used to transport electrons into and/or out of the electrode with which the current collector is associated. Most typically, the current collector is in the form of a metal layer adjacent to the region in which the electrode active material is located. One disadvantage of using a metal sheet is its poor adhesion to the electrode and therefore reduced electrical contact between these two.

Accordingly, improvements to electrochemical cells are desired.

SUMMARY

Electrochemical cells comprising electrodes comprising lithium, from which in situ current collectors may be formed, are generally described. The subject matter of the present invention involves, in some cases, interrelated products, alternative solutions to a particular problem, and/or a plurality of different uses of one or more systems and/or articles.

In one aspect, an electrochemical cell is described. The electrochemical cell may comprise a cathode. The electrochemical cell may further comprise an anode comprising a solid solution of lithium and at least one non-lithium metal, the anode having an active surface. The electrochemical cell may further comprise an electrolyte in electrochemical communication with the cathode and the anode. The electrochemical cell may be configured such that it is in a charged state when it is first assembled. The electrochemical cell may be under an applied anisotropic force having a force component normal to the active surface of the anode.

In some embodiments, the anisotropic force and the electrochemical cell may be configured such that, when the electrochemical cell is fully cycled 10 times, the anode has a porosity of less than 20% immediately after the discharge of the tenth cycle, and 75 wt % or less of the amount of lithium present in the anode in its initial fully-charged state remains in the anode immediately after the discharge of the tenth cycle.

In some embodiments, the at least one non-lithium metal may be present at a sufficient volume such that, when the electrochemical cell is fully cycled 10 times, the anode has a porosity of less than 20% immediately after the discharge of the tenth cycle, and 75 wt % or less of the amount of lithium present in the anode in its initial fully-charged state remains in the anode immediately after the discharge of the tenth cycle.

In some embodiments, the anisotropic force and the electrochemical cell may be configured such that, when the electrochemical cell is fully cycled 10 times, the anode has a sheet resistance of less than 1000 Ω/sq. immediately after the discharge of the tenth cycle, and 75 wt % or less of the amount of lithium present in the anode in its initial fully-charged state remains in the anode immediately after the discharge of the tenth cycle.

In some embodiments, the at least one non-lithium metal may be present at a sufficient volume such that, when the electrochemical cell is fully cycled 10 times, the at least one non-lithium metal forms a region having a sheet resistance of less than 1000 Ω/sq. immediately after the discharge of the tenth cycle, and 75 wt % or less of the amount of lithium present in the anode in its initial fully-charged state remains in the anode immediately after the discharge of the tenth cycle.

In one aspect, an electrochemical cell is described. The electrochemical cell may comprise a cathode. The electrochemical cell may further comprise an anode comprising a solid solution of lithium and at least one non-lithium metal, the anode having an active surface. The electrochemical cell may be configured such that it is in a charged state when it is first assembled. The electrochemical cell may be under an applied anisotropic force having a force component normal to the active surface of the anode.

In some embodiments, the anisotropic force and the electrochemical cell may be configured such that, when the electrochemical cell is fully cycled 50 times, the anode has a porosity of less than 20% immediately after the discharge of the 50th cycle, and 75 wt % or less of the amount of lithium present in the anode in its initial fully-charged state remains in the anode immediately after the discharge of the 50th cycle.

In some embodiments, the at least one non-lithium metal may be present at a sufficient volume such that, when the electrochemical cell is fully cycled 50 times, the anode has a porosity of less than 20% immediately after the discharge of the 50th cycle, and 75 wt % or less of the amount of lithium present in the anode in its initial fully-charged state remains in the anode immediately after the discharge of the 50th cycle.

In some embodiments, the anisotropic force and the electrochemical cell may be configured such that, when the electrochemical cell is fully cycled 50 times, the anode has a sheet resistance of less than 1000 Ω/sq. immediately after the discharge of the 50th cycle, and 75 wt % or less of the amount of lithium present in the anode in its initial fully-charged state remains in the anode immediately after the discharge of the 50th cycle.

In some embodiments, the at least one non-lithium metal may be present at a sufficient volume such that, when the electrochemical cell is fully cycled 50 times, the at least one non-lithium metal forms a region having a sheet resistance of less than 1000 Ω/sq. immediately after the discharge of the 50th cycle, and 75 wt % or less of the amount of lithium present in the anode in its initial fully-charged state remains in the anode immediately after the discharge of the 50th cycle.

In one aspect, an electrochemical cell is described. The electrochemical cell may comprise a cathode. The electrochemical cell may further comprise an anode comprising a solid solution of lithium and at least one non-lithium metal, the anode having an active surface. The electrochemical cell may be configured such that it is in a charged state when it is first assembled. The electrochemical cell may be under an applied anisotropic force having a force component normal to the active surface of the anode.

In some embodiments, the anisotropic force and the electrochemical cell may be configured such that, when the electrochemical cell is fully cycled 10 times, immediately after the discharge of the tenth cycle, the anode has a porosity that is less than 50% of the porosity that would be present in an equivalent cell without the applied anisotropic force, immediately after the discharge of its tenth cycle.

In some embodiments, the at least one non-lithium metal may be present at a sufficient volume such that, when the electrochemical cell is fully cycled 10 times, immediately after the discharge of the tenth cycle, the anode has a porosity that is less than 50% of the porosity that would be present in an equivalent cell without the at least one non-lithium metal, immediately after the discharge of its tenth cycle.

In some embodiments, the anisotropic force and the electrochemical cell may be configured such that, when the electrochemical cell is fully cycled 10 times, immediately after the discharge of the tenth cycle, the anode has a sheet resistance that is less than 50% of the sheet resistance that would be present in an equivalent cell without the applied anisotropic force, immediately after the discharge of its tenth cycle.

In some embodiments, the at least one non-lithium metal may be present at a sufficient volume such that, when the electrochemical cell is fully cycled 10 times, immediately after the discharge of the tenth cycle, the anode has a sheet resistance that is less than 50% of the sheet resistance that would be present in an equivalent cell without the at least one non-lithium metal, immediately after the discharge of its tenth cycle.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
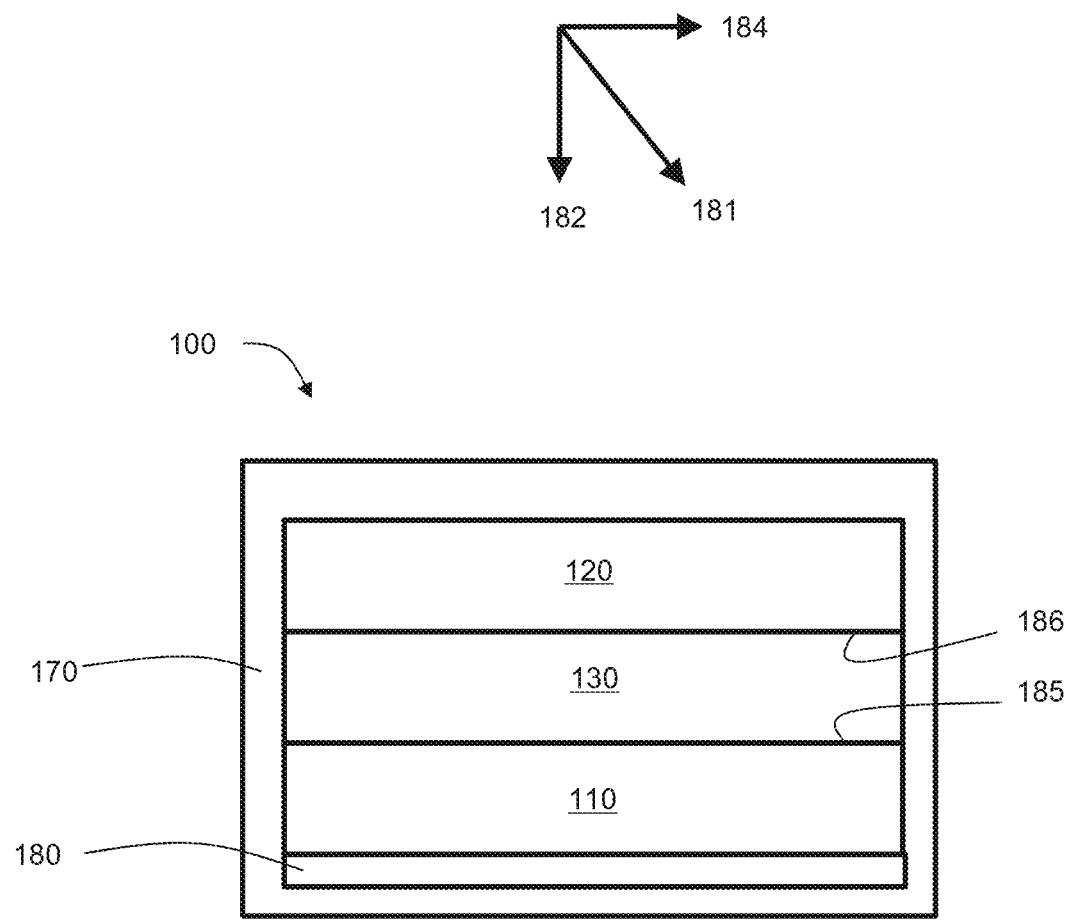
FIG. 1 shows a schematic diagram of a cross-section of an electrochemical cell according to one set of embodiments of the invention.

Electrochemical cells (e.g., rechargeable lithium batteries) comprising electrodes comprising lithium (e.g., in the form of a solid solution with non-lithium metals), from which in situ current collectors may be formed, are generally described. Certain embodiments of the present invention are related to inventive arrangements of materials in lithium-containing electrodes and/or inventive uses of such electrodes. In some embodiments, one or more non-lithium components of the lithium-containing electrode can be used as a current collector. The current collector, when thus formed, can be positioned within the original volume of the electrode, prior to the removal of lithium-based electrode active material during discharge. Use in this manner can eliminate the need for a separate, standalone current collector, which can, according to certain embodiments, lead to increases in energy density and/or specific energy of the electrochemical cell in which such electrodes are employed.

Examples of electrochemical cells in which the present invention may be practiced, include, without limitation, lithium-ion (Li-ion), lithium-sulfur (Li—S) and lithium-air (Li-air) batteries. In some embodiments, the electrochemical cells may be rechargeable electrochemical cells (also referred to as secondary electrochemical cells).

A lithium metal solid solution may be used, according to certain embodiments, as an anode or a partial anode. Use of such solid solutions may, according to certain embodiments, overcome certain disadvantages resulting from localized lithium depletion in lithium-based batteries, without the need to employ an additional current collector. During cell cycling, lithium is stripped from the anode during a discharge stage and redeposited at the anode during a charge stage. According to one or more embodiments of the present invention, however, the non-lithium metal component is able to form a solid solution with residual lithium at ambient temperature, and remains as an intact, electrically continuous current collector regardless of state of charge or degree of lithium depletion.

According to one or more embodiments, the disclosed electrode (e.g., anode) comprising a solid solution of lithium and at least one non-lithium metal is incorporated into an electrochemical cell. The cell may further comprise a cathode. The cathode and the anode may each have an active surface. The cell may comprise an electrolyte in electrochemical communication with the cathode and the anode. An electrolyte is in electrochemical communication with an anode and a cathode when it is capable of shuttling ions between the anode and the cathode during discharge of the electrochemical cell. The cell may comprise a separator proximate to the electrolyte, as discussed further below. In the embodiments described herein, electrochemical cells (e.g., rechargeable batteries) may undergo a charge/discharge cycle involving deposition of an electrode active material (e.g., lithium metal) on or in the anode during charging and removal of the electrode active material from the anode during discharging. During at least one period of operation, the electrochemical cell may be under an applied anisotropic force having a force component normal to the active surface of the anode.

In some embodiments, the electrochemical cell is configured such that it is in a charged state when it is first assembled. For example, in some embodiments, electrochemical cells in which the cathode is not lithium-based (such as a sulfur-based cathode) are in a charged state when first assembled. In some embodiments, the electrochemical cell is configured such that it is in a discharged state when it is first assembled. For example, in some embodiments, electrochemical cells in which the cathode is lithium-based (such as a lithium intercalation cathode) are in a discharged state when first assembled.

As would be understood by a person of ordinary skill in the art, a cell is considered to be in a charged state when first assembled when it is fully or predominantly (i.e., greater than 50%) charged when it is first assembled. In certain embodiments, it is advantageous to employ a cell that is in a fully charged state when it is first assembled.

Likewise, a cell is considered to be in a discharged state when first assembled when it is fully or predominantly (i.e., greater than 50%) discharged when first assembled. In certain embodiments, it is advantageous to employ a cell that is in a fully discharged state when it is first assembled.

During operation, the electrochemical cell may undergo a series of charge/discharge cycles. It should be understood that a full cycle is made up of a complete charge followed by a complete discharge. For example, in embodiments in which the cell is assembled in a discharged state (e.g., cells having a lithium intercalation cathode), the first full cycle is complete after undergoing a first complete charge, followed by a first complete discharge. However, in embodiments, in which the cell is assembled in a charged state (e.g., cells having a sulfur-based cathode), the first full cycle is completed after a first complete discharge that follows either no charging step (if the cell was fully charged at first assembly) or that follows a partial charging step (if the cell was partially discharged at first assembly).

As used herein, the term "initial fully-charged state" refers to the first fully charged state of an electrochemical cell. For example, in embodiments where the cell is assembled in a fully charged state, the initial fully-charged state is the state at the completion of assembly. However, in embodiments where the cell is assembled in a discharged state (e.g., in a fully discharged state or in a predominantly discharged state) or in a charged state that is not a fully charged state, the initial fully charged state is the state upon the first full charge following assembly.

In some embodiments, the anisotropic force and the electrochemical cell are configured to provide a beneficial reduction in porosity in the anode, as measured after undergoing a given number of charge/discharge cycles. The term "porosity" refers to a value of a material calculated by dividing the pore volume of the material by the sum of the pore volume and the material volume, as would be understood by a person of ordinary skill in the art. The term "true density" refers to a density value of a material calculated by dividing the mass of the material by the volume of the material after subtracting out the pore volume, as would be understood by a person of ordinary skill in the art. The term "bulk density" refers to a density value of a material calculated by dividing the mass of the material by the volume of the material including the pore volume. These terms are further described, herein, with reference to the figures.

In some embodiments (for example, in some embodiments in which the electrochemical cell is configured such that it is in a charged state when it is first assembled), the anisotropic force and the electrochemical cell are configured such that, when the electrochemical cell is fully cycled 10 times, the anode has a porosity of less than 20% immediately after the discharge of the tenth cycle, and, also, 75 wt % or less of the amount of lithium present in the anode in its initial fully-charged state remains in the anode immediately after the discharge of the tenth cycle. In other words, an anode having a porosity of less than 20% would have a pore volume that is less than 20% of the combined pore volume and material volume of the anode.

By way of example, if an anode contains 10 microns of lithium in its first fully charged state (e.g., as assembled, in some embodiments, or when first charged after assembly, in others), and contains 7.5 microns of lithium immediately after the discharge of the tenth cycle, then 75 wt % of the amount of lithium present in the anode in its initial fully-charged state has remained in the anode immediately after the discharge of the tenth cycle. This percentage may be determined by measuring the amount of lithium in the anode when it is in its first fully charged state (either at assembly, or after the first charging subsequent to assembly). The cell may then undergo a series of charge/discharge cycles, and after a set point (for example, immediately after the discharge of the tenth cycle), the amount of lithium in the anode is again measured. The comparison of the second value with the initial value may then be used to determine the wt % difference.

In some embodiments (for example, in some embodiments in which the electrochemical cell is configured such that it is in a charged state when it is first assembled), the anisotropic force and the electrochemical cell are configured such that, when the electrochemical cell is fully cycled 10 times, the anode has a porosity of less than 15%, 10%, 5%, or 1% immediately after the discharge of the tenth cycle. In some embodiments, the anisotropic force and the electrochemical cell are configured such that, when the electrochemical cell is fully cycled 10 times, 60 wt % or less, 50 wt % or less, 40 wt % or less, 30 wt % or less, 20 wt % or less, or 10 wt % or less of the amount of lithium present in the anode in its initial fully-charged state remains in the anode immediately after the discharge of the tenth cycle.

In some embodiments (for example, in some embodiments in which the electrochemical cell is configured such that it is in a discharged state when it is first assembled), the anisotropic force and the electrochemical cell are configured such that, when the electrochemical cell is fully cycled 50 times, the anode has a porosity of less than 20% immediately after the discharge of the 50th cycle, and, also, 75 wt % or less of the amount of lithium present in the anode in its initial fully-charged state (e.g., upon its first full charge subsequent to assembly, if assembled not in a fully charged state) remains in the anode immediately after the discharge of the 50th cycle. In some embodiments, the anisotropic force and the electrochemical cell are configured such that, when the electrochemical cell is fully cycled 50 times, the anode has a porosity of less than 15%, 10%, 5%, or 1% immediately after the discharge of the 50th cycle. In some embodiments, the anisotropic force and the electrochemical cell are configured such that, when the electrochemical cell is fully cycled 50 times, 60 wt % or less, 50 wt % or less, 40 wt % or less, 30 wt % or less, 20 wt % or less, or 10 wt % or less of the amount of lithium present in the anode in its initial fully-charged state remains in the anode immediately after the discharge of the 50th cycle.

In some embodiments, the anisotropic force and the electrochemical cell are configured such that, when the electrochemical cell is fully cycled 10 times, immediately after the discharge of the tenth cycle, the anode has a porosity that is less than 50% of the porosity that would be present in an equivalent cell without the applied anisotropic force, immediately after the discharge of its tenth cycle. In some embodiments, the anisotropic force and the electrochemical cell are configured such that, when the electrochemical cell is fully cycled 10 times, immediately after the discharge of the tenth cycle, the anode has a porosity of less than 40%, 30%, 20%, or 10% of the porosity that would be present in an equivalent cell without the applied anisotropic force, immediately after the discharge of its tenth cycle.

In some embodiments, the at least one non-lithium metal is present at a sufficient volume to provide a beneficial reduction in porosity in the anode, as measured after undergoing a given number of charge/discharge cycles.

In some embodiments (for example, in some embodiments in which the electrochemical cell is configured such that it is in a charged state when it is first assembled), the at least one non-lithium metal is present at a sufficient volume such that, when the electrochemical cell is fully cycled 10 times, the anode has a porosity of less than 20% immediately after the discharge of the tenth cycle, and, also, 75 wt % or less of the amount of lithium present in the anode in its initial fully-charged state remains in the anode immediately after the discharge of the tenth cycle. In some embodiments, the at least one non-lithium metal is present at a sufficient volume such that, when the electrochemical cell is fully cycled 10 times, the anode has a porosity of less than 15%, 10%, 5%, or 1% immediately after the discharge of the tenth cycle. In some embodiments, the at least one non-lithium metal is present at a sufficient volume such that, when the electrochemical cell is fully cycled 10 times 60 wt % or less, 50 wt % or less, 40 wt % or less, 30 wt % or less, 20 wt % or less, or 10 wt % or less of the amount of lithium present in the anode in its initial fully-charged state remains in the anode immediately after the discharge of the tenth cycle.

In some embodiments (for example, in some embodiments in which the electrochemical cell is configured such that it is in a discharged state when it is first assembled), the at least one non-lithium metal is present at a sufficient volume such that, when the electrochemical cell is fully cycled 50 times, the anode has a porosity of less than 20% immediately after the discharge of the $50^{th}$ cycle, and, also, 75 wt % or less of the amount of lithium present in the anode in its initial fully-charged state remains in the anode immediately after the discharge of the $50^{th}$ cycle. In some embodiments, the at least one non-lithium metal is present at a sufficient volume such that, when the electrochemical cell is fully cycled 50 times, the anode has a porosity of less than 15%, 10%, 5%, or 1% immediately after the discharge of the $50^{th}$ cycle. In some embodiments, the at least one non-lithium metal is present at a sufficient volume such that, when the electrochemical cell is fully cycled 50 times, 60 wt % or less, 50 wt % or less, 40 wt % or less, 30 wt % or less, 20 wt % or less, or 10 wt % or less of the amount of lithium present in the anode in its initial fully-charged state remains in the anode immediately after the discharge of the $50^{th}$ cycle.

In some embodiments, the at least one non-lithium metal is present at a sufficient volume such that, when the electrochemical cell is fully cycled 10 times, immediately after the discharge of the tenth cycle, the anode has a porosity that is less than 50% of the porosity that would be present in an equivalent cell without the at least one non-lithium metal, immediately after the discharge of its tenth cycle. In some embodiments, the at least one non-lithium metal is present at a sufficient volume such that, when the electrochemical cell is fully cycled 10 times, immediately after the discharge of the tenth cycle, the anode has a porosity of less than 40%, 30%, 20%, or 10% of the porosity that would be present in an equivalent cell without the at least one non-lithium metal, immediately after the discharge of its tenth cycle. In some embodiments, the anisotropic force and the electrochemical cell are configured to provide a beneficial reduction in sheet resistance in the anode, as measured after undergoing a given number of charge/discharge cycles. Sheet resistance is measured using a 4-point probe where a current is applied between 2 of the probes and the voltage is measured between the other 2 probes using a voltmeter (e.g., a Loresta-GP 4-point probe, commercially available from Mitsubishi).

In some embodiments (for example, in some embodiments in which the electrochemical cell is configured such that it is in a charged state when it is first assembled), the anisotropic force and the electrochemical cell are configured such that when the electrochemical cell is fully cycled 10 times, the anode has a sheet resistance of less than 1000 Ω/sq. immediately after the discharge of the tenth cycle, and, also, 75 wt % or less of the amount of lithium present in the anode in its initial fully-charged state remains in the anode immediately after the discharge of the tenth cycle. In some embodiments, the anisotropic force and the electrochemical cell are configured such that, when the electrochemical cell is fully cycled 10 times, the anode has a sheet resistance of less than 900 Ω/sq., 800 Ω/sq., 700 Ω/sq., 600 Ω/sq., 500 Ω/sq., 400 Ω/sq., 300 Ω/sq., 200 Ω/sq., or 100 Ω/sq. immediately after the discharge of the tenth cycle. In some embodiments, the anisotropic force and the electrochemical cell are configured such that, when the electrochemical cell is fully cycled 10 times, 60 wt % or less, 50 wt % or less, 40 wt % or less, 30 wt % or less, 20 wt % or less, or 10 wt % or less of the amount of lithium present in the anode in its initial fully-charged state remains in the anode immediately after the discharge of the tenth cycle.

In some embodiments (for example, in some embodiments in which the electrochemical cell is configured such that it is in a discharged state when it is first assembled), the anisotropic force and the electrochemical cell are configured such that, when the electrochemical cell is fully cycled 50 times, the anode has a sheet resistance of less than 1000 Ω/sq. immediately after the discharge of the 50th cycle, and, also, 75 wt % or less of the amount of lithium present in the anode in its initial fully-charged state remains in the anode immediately after the discharge of the 50th cycle. In some embodiments, the anisotropic force and the electrochemical cell are configured such that, when the electrochemical cell is fully cycled 50 times, the anode has a sheet resistance of less than 900 Ω/sq., 800 Ω/sq., 700 Ω/sq., 600 Ω/sq., 500 Ω/sq., 400 Ω/sq., 300 Ω/sq., 200 Ω/sq., or 100 Ω/sq. immediately after the discharge of the 50th cycle. In some embodiments, the anisotropic force and the electrochemical cell are configured such that, when the electrochemical cell is fully cycled 50 times, 60 wt % or less, 50 wt % or less, 40 wt % or less, 30 wt % or less, 20 wt % or less, or 10 wt % or less of the amount of lithium present in the anode in its initial fully-charged state remains in the anode immediately after the discharge of the 50th cycle.

In some embodiments, the anisotropic force and the electrochemical cell are configured such that, when the electrochemical cell is fully cycled 10 times, immediately after the discharge of the tenth cycle, the anode has a sheet resistance that is less than 50% of the sheet resistance of an equivalent cell without the applied anisotropic force immediately after the discharge of its tenth cycle. In some embodiments, the anisotropic force and the electrochemical cell are configured such that, when the electrochemical cell is fully cycled 10 times, immediately after the discharge of the tenth cycle, the anode has a sheet resistance of less than 40%, 30%, 20%, or 10% of the sheet resistance that would be present in an equivalent cell without the applied anisotropic force immediately after the discharge of its tenth cycle.

In some embodiments, the at least one non-lithium metal is present at a sufficient volume to provide a beneficial reduction in sheet resistance in the anode, as measured after undergoing a given number of charge/discharge cycles.

In some embodiments (for example, in some embodiments in which the electrochemical cell is configured such that it is in a charged state when it is first assembled), the at least one non-lithium metal is present at a sufficient volume such that, when the electrochemical cell is fully cycled 10 times, the anode has a sheet resistance of less than 1000 $\Omega$/sq. immediately after the discharge of the tenth cycle, and, also, 75 wt % or less of the amount of lithium present in the anode in its initial fully-charged state remains in the anode immediately after the discharge of the tenth cycle. In some embodiments, the at least one non-lithium metal is present at a sufficient volume such that, when the electrochemical cell is fully cycled 10 times, the anode has a sheet resistance of less than 900 $\Omega$/sq., 800 $\Omega$/sq., 700 $\Omega$/sq., 600 $\Omega$/sq., 500 $\Omega$/sq., 400 $\Omega$/sq., 300 $\Omega$/sq., 200 $\Omega$/sq., or 100 $\Omega$/sq. immediately after the discharge of the tenth cycle. In some embodiments, the at least one non-lithium metal is present at a sufficient volume such that, when the electrochemical cell is fully cycled 10 times, 60 wt % or less, 50 wt % or less, 40 wt % or less, 30 wt % or less, 20 wt % or less, or 10 wt % or less of the amount of lithium present in the anode in its initial fully-charged state remains in the anode immediately after the discharge of the tenth cycle.

In some embodiments (for example, in some embodiments in which the electrochemical cell is configured such that it is in a discharged state when it is first assembled), the at least one non-lithium metal is present at a sufficient volume such that, when the electrochemical cell is fully cycled 50 times, the anode has a sheet resistance of less than 1000 $\Omega$/sq. immediately after the discharge of the 50th cycle, and, also, 75 wt % or less of the amount of lithium present in the anode in its initial fully-charged state remains in the anode immediately after the discharge of the 50th cycle. In some embodiments, the at least one non-lithium metal is present at a sufficient volume such that, when the electrochemical cell is fully cycled 50 times, the anode has a sheet resistance of less than 900 $\Omega$/sq., 800 $\Omega$/sq., 700 $\Omega$/sq., 600 $\Omega$/sq., 500 $\Omega$/sq., 400 $\Omega$/sq., 300 $\Omega$/sq., 200 $\Omega$/sq., or 100 $\Omega$/sq. immediately after the discharge of the 50th cycle. In some embodiments, the at least one non-lithium metal is present at a sufficient volume such that, when the electrochemical cell is fully cycled 50 times, 60 wt % or less, 50 wt % or less, 40 wt % or less, 30 wt % or less, 20 wt % or less, or 10 wt % or less of the amount of lithium present in the anode in its initial fully-charged state remains in the anode immediately after the discharge of the 50th cycle.

In some embodiments, the at least one non-lithium metal is present at a sufficient volume such that, when the electrochemical cell is fully cycled 10 times, immediately after the discharge of the tenth cycle, the anode has a sheet resistance that is less than 50% of the sheet resistance that would be present in an equivalent cell without the at least one non-lithium metal, immediately after the discharge of its tenth cycle. In some embodiments, the at least one non-lithium metal is present at a sufficient volume such that, when the electrochemical cell is fully cycled 10 times, immediately after the discharge of the tenth cycle, the anode has a sheet resistance of less than 40%, 30%, 20%, or 10% of the sheet resistance that would be present in an equivalent cell without the at least one non-lithium metal, immediately after the discharge of its tenth cycle.

In some embodiments, each of the electrodes comprise electrode active material. Electrode active materials are those materials associated with an electrode and which participate in the electrochemical reaction(s) of the electrochemical cell that generate electrical current. Cathode active materials are electrode active materials associated with the cathode of the electrochemical cell, and anode active materials are electrode active materials associated with the anode of the electrochemical cell.

FIG. 1 shows an example of an electrochemical cell 100, in which an electrode (e.g., anode) 120, as described herein, may be incorporated. The electrochemical cell 100 includes a cathode 110, an electrolyte layer 130, and an anode 120. The anode 120 comprises a solid solution of lithium and at least one non-lithium metal. An active surface 185 of the cathode 110 is positioned at the interface of the cathode 110 and the electrolyte 130. An active surface 186 of the anode 120 is positioned at the interface of the anode 120 and electrolyte layer 130. In some embodiments, a current collector 180 is associated with the cathode 110. However, the incorporation of a solid solution in the anode 120 allows for the elimination of a separate current collector associated with the anode 120. Instead, a current collector is formed in situ from material in the anode 120. The electrochemical cell 100 may be situated in an optional enclosed containment structure 170.

In some embodiments described herein, a force, or forces, is (are) applied to portions of an electrochemical cell. Such application of force may reduce irregularity or roughening of an electrode surface of the cell, thereby improving performance. Electrochemical cells in which anisotropic forces are applied and methods for applying such forces are described, for example, in U.S. Pat. No. 9,105,938, issued Aug. 11, 2015, published as U.S. Patent Publication No. 2010/0035128 on Feb. 11, 2010, and entitled "Application of Force in Electrochemical Cells," which is incorporated herein by reference in its entirety for all purposes.

The force may comprise, in some instances, an anisotropic force with a component normal to an active surface of the anode of the electrochemical cell. In the embodiments described herein, electrochemical cells (e.g., rechargeable batteries) may undergo a charge/discharge cycle involving deposition of an electrode active material (e.g., lithium metal) on or in the anode during charging and removal of the electrode active material from the anode during discharging. The uniformity with which the metal is deposited on the anode may affect cell performance. For example, when lithium metal is removed from and/or redeposited on an anode, it may, in some cases, result in an uneven surface. For example, upon redeposition it may deposit unevenly forming a rough surface. The roughened surface may increase the amount of lithium metal available for undesired chemical reactions which may result in decreased cycling lifetime and/or poor cell performance. The application of force to the electrochemical cell has been found, in accordance with certain embodiments described herein, to reduce such behavior and to improve the cycling lifetime and/or performance of the cell. In some embodiments, the electrochemical cell is capable of being cycled at least 70 times before its capacity in a charged state is reduced to less than 80% of an original charge capacity.

Referring to FIG. 1, a force may be applied in the direction of arrow 181. Arrow 182 illustrates the component of force 181 that is normal to active surface 185 of cathode 110 and active surface 186 of anode 120. In the case of a curved surface, for example, a concave surface or a convex surface, the force may comprise an anisotropic force with a component normal to a plane that is tangent to the curved surface at the point at which the force is applied.

In some embodiments, an anisotropic force with a component normal to an active surface of the anode is applied during at least one period of time during charge and/or discharge of the electrochemical cell. In some embodiments, the force may be applied continuously, over one period of time, or over multiple periods of time that may vary in duration and/or frequency. The anisotropic force may be applied, in some cases, at one or more pre-determined locations, optionally distributed over an active surface of the anode. In some embodiments, the anisotropic force is applied uniformly over one or more active surfaces of the anode.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes certain forces applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

A force with a "component normal" to a surface, for example an active surface of an anode, is given its ordinary meaning as would be understood by those of ordinary skill in the art and includes, for example, a force which at least in part exerts itself in a direction substantially perpendicular to the surface. Those of ordinary skill can understand other examples of these terms, especially as applied within the description of this document.

Figure 2:
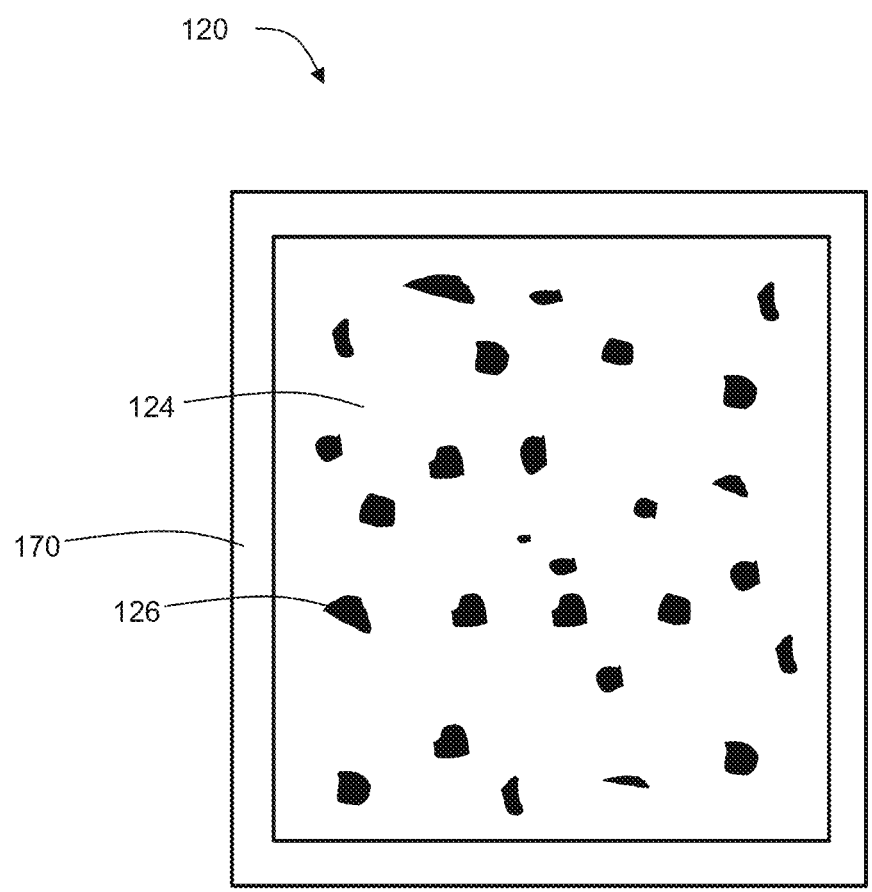
FIG. 2 shows a schematic diagram of an electrode of an electrochemical cell according to one set of embodiments of the invention.

FIG. 2 shows a view of the surface of the anode 120 of the electrochemical cell 100 of FIG. 1, after the electrochemical cell 100 has been fully cycled for a number of cycles, for example, ten times, and immediately after a full discharge. In such a state, most of the lithium portion (e.g., at least 60%, 70%, 80%, 90%, or greater) of the solid solution 124 is removed from the anode 120, with the remaining solid solution functioning as an in situ current collector, formed primarily by the remaining non-lithium metal component of the anode 120. In some embodiments, 75 wt % or less, 60 wt % or less, 50 wt % or less, 40 wt % or less, 30 wt % or less, 20 wt % or less, or 10 wt % or less of the amount of lithium present in the anode 120 in its initial fully-charged state remains in the anode 120 immediately after the discharge of the tenth cycle. In some embodiments, 75 wt % or less, 60 wt % or less, 50 wt % or less, 40 wt % or less, 30 wt % or less, 20 wt % or less, or 10 wt % or less of the amount of lithium present in the anode 120 in its initial fully-charged state remains in the anode 120 immediately after the discharge of the 50th cycle. In this state, a number of pores 126 are also present in the anode 120. The pores 126 form a pore volume. The anode 120 has a porosity calculated by dividing the volume of the pores 126 by the sum of the pore volume 126 and the volume of the solid solution 124 forming anode 120. The solid solution 124 forms a material volume. The solid solution 124 has a bulk density calculated by dividing the mass of the material 124 by the volume of the material 124 including the volume of the pores 126. The solid solution 124 has a true density calculated by dividing the mass of material 124 by the volume of material 124 after subtracting out the volume of pores 126.

In the discharged state shown in FIG. 2, an anisotropic force 181 (shown in FIG. 1) is applied having a force component 182 normal to the active surface of the anode 120, as described above with regard to FIG. 1. In this discharged state, the cell 100 and the anisotropic force 181 are configured such that the anode 120 has a pore volume of less than 20%. In this discharged state, the anisotropic force 181 is configured such that the anode 120 has a bulk density that is at least 80% of its bulk density. Other values for pore volume or bulk density are also possible, as described above. In this discharged state, the non-lithium metal is present in the solid solution 124 at a sufficient volume to provide an anode 120 having a pore volume of less than 20%.

In the fully discharged state shown in FIG. 2, the cell 100 and the anisotropic force 181 are configured such that the anode 120 (e.g., the in situ current collector) formed by the solid solution 124 has a sheet resistance of less than 1000 Ω/sq. The non-lithium metal is present in the solid solution 124 at a sufficient volume to provide an anode 120 having a sheet resistance of less than 1000 Ω/sq. Other values for the sheet resistance are also possible, as described above. In the discharged state shown in FIG. 2, 75 wt % or less of the amount of lithium present in the anode 120 in its initial fully-charged state remains in the anode 120.

Those of ordinary skill in the art are familiar with solid solutions in the context of metal materials, which generally refer to arrangements in which two or more metals are mixed within a solid state material. As used herein, the term "solid solution" refers to a homogeneous mixture of two or more kinds of metals occurring in the solid state, and is distinguished from an intermetallic compound, whose crystal structure differs from that of the individual constituents, or other types of alloys. In some embodiments, a solid solution comprises a compound in which a first component is present within the interstices of the crystal structure of a second component. The solid solution may be a single phase solid solution.

According to one or more embodiments, the one or more non-lithium metals chosen to form the solid solution with lithium may be selected according to certain criteria, as follows.

In some embodiments, the non-lithium metal is not electrochemically active in the cell operating voltage window (e.g., from about 0 V to about 5 V). In some embodiments, less than about 25 wt %, less than about 10 wt %, less than about 5 wt %, or less than about 1 wt % of the at least one non-lithium metal participates in an electrochemical reaction during a first charge and discharge cycle of the cell operating within the above listed voltage window, as determined through energy-dispersive x-ray spectroscopy (EDS) analysis.

In some embodiments, the non-lithium metal is not reactive with the electrolyte. In some embodiments, non-reactivity with the electrolyte allows the non-lithium metal to remain as an intact current collector. In some embodiments, less than about 25 wt %, less than about 10 wt %, less than about 5 wt %, or less than about 1 wt % of the at least one non-lithium metal participates in a chemical reaction with the electrolyte, as determined through EDS analysis.

In some embodiments, the solid solution may have a relatively low yield strength. For example, the solid solution may have a yield strength of from 0.1 to 100 MPa, or of from 0.4 to 40 MPa. In some embodiments, the incorporation of a solid solution having such a yield strength aids in the formation of a substantially continuous sheet of non-lithium material within the cell to serve as an in situ current collector. In some embodiments, the solid solution has a yield strength between that of the lithium and the non-lithium component. Yield strength may be measured by a mechanical tester (such as one commercially available from INSTRON) or by a hardness tester following the testing protocol described in ASTM E2546.

In some embodiments, the amount of non-lithium metal may be present in the anode in an amount sufficient to form a substantially continuous sheet. In some embodiments, the amount of non-lithium metal may be present in the anode in an amount sufficient to form a current collector. In some embodiments, the amount of non-lithium metal present in the anode is otherwise minimized so to increase the energy density and/or specific energy of the electrochemical cell. Such an arrangement allows for the formation of an in situ current collector while optimizing the energy density of the electrode. In some embodiments, the non-lithium metal in the anode is equal to or less than 25 wt %, 10 wt %, 5 wt % or 1 wt % of the combined weight of lithium and non-lithium metal in the anode during a fully charged state. In some embodiments, the non-lithium metal in the anode is at least 0.1 wt %, 1 wt %, 5 wt % or 10 wt % of the combined weight of lithium and non-lithium metal in the anode during a fully charged state. In some embodiments, the non-lithium metal in the anode is equal to or less than 25 wt %, 10 wt %, 5 wt % or 1 wt % of the combined weight of lithium and non-lithium metal in the anode during a fully charged state, as assembled. In some embodiments, the non-lithium metal in the anode is at least 0.1 wt %, 1 wt %, 5 wt % or 10 wt % of the combined weight of lithium and non-lithium metal in the anode during a fully charged state, as assembled. In some embodiments, the non-lithium metal in the anode is equal to or less than 25 wt %, 10 wt %, 5 wt % or 1 wt % of the combined weight of lithium and non-lithium metal in the anode during its first fully charged state after assembly. In some embodiments, the non-lithium metal in the anode is at least 0.1 wt %, 1 wt %, 5 wt % or 10 wt % of the combined weight of lithium and non-lithium metal in the anode during its first fully charged state after assembly. Combinations of these ranges are also possible.

In some embodiments, the non-lithium metal forms a solid solution with lithium at ambient temperature. In some embodiments, the non-lithium metal forms a solid solution with lithium at a temperature of between −40° C. and 80° C. In some embodiments, the non-lithium metal forms a solid solution with lithium in the cell during cycling and remains as an intact current collector.

In some embodiments, the at least one non-lithium metal is selected from the group consisting of magnesium, zinc, lead, tin, platinum, gold, aluminum, cadmium, silver, mercury, palladium, gallium, sodium, potassium, rubidium, cesium, francium, and combinations thereof. In some embodiments, the at least one non-lithium metal is selected from the group consisting of magnesium, zinc, lead, tin, platinum, gold, aluminum, cadmium, silver, mercury, and combinations thereof. In some embodiments, the at least one non-lithium metal is selected from the group consisting of magnesium, zinc, lead, platinum, gold, cadmium, silver, mercury, and combinations thereof.

In some embodiments, the at least one non-lithium metal comprises or consists essentially of magnesium. In some embodiments, the at least one non-lithium metal comprises or consists essentially of zinc. In some embodiments, the at least one non-lithium metal comprises or consists essentially of lead. In some embodiments, the at least one non-lithium metal comprises or consists essentially of tin. In some embodiments, the at least one non-lithium metal comprises or consists essentially of platinum. In some embodiments, the at least one non-lithium metal comprises or consists essentially of gold. In some embodiments, the at least one non-lithium metal comprises or consists essentially of aluminum. In some embodiments, the at least one non-lithium metal comprises or consists essentially of cadmium. In some embodiments, the at least one non-lithium metal comprises or consists essentially of silver. In some embodiments, the at least one non-lithium metal comprises or consists essentially of mercury. In some embodiments, the at least one non-lithium metal comprises or consists essentially of palladium. In some embodiments, the at least one non-lithium metal comprises or consists essentially of gallium. In some embodiments, the at least one non-lithium metal comprises or consists essentially of sodium. In some embodiments, the at least one non-lithium metal comprises or consists essentially of potassium. In some embodiments, the at least one non-lithium metal comprises or consists essentially of rubidium. In some embodiments, the at least one non-lithium metal comprises or consists essentially of cesium. In some embodiments, the at least one non-lithium metal comprises or consists essentially of francium.

In some embodiments the at least one non-lithium metal excludes the group consisting of silicon, germanium, tin, antimony, bismuth, and aluminum. In some embodiments, the at least one non-lithium metal excludes silicon. In some embodiments, the at least one non-lithium metal excludes germanium. In some embodiments, the at least one non-lithium metal excludes tin. In some embodiments, the at least one non-lithium metal excludes antimony. In some embodiments, the at least one non-lithium metal excludes bismuth. In some embodiments, the at least one non-lithium metal excludes aluminum.

It is to be understood that one or more non-lithium metals can be used. That is, the non-lithium component of the solid solution can be a single metal or a combination of two or more metals.

Anodes described herein, such as lithium and non-lithium metal solid solutions, may be formed by any suitable method. Such methods may include, for example, physical deposition methods, chemical vapor deposition methods, plasma enhanced chemical vapor deposition techniques, thermal evaporation (e.g., resistive, inductive, radiation, and electron beam heating), sputtering (e.g., diode, DC magnetron, RF, RF magnetron, pulsed, dual magnetron, AC, FM, and reactive sputtering), jet vapor deposition, laser ablation, extrusion, electroplating, ion plating, and cathodic arc. In some instances, Li vapor and a vapor of the non-lithium metal are co-deposited (simultaneously) onto a substrate, e.g., using methods such as those mentioned above, to form the solid solution anode. Deposition can be carried out in a vacuum or inert atmosphere.

As used herein, "cathode" refers to the electrode in which an electrode active material is oxidized during charging and reduced during discharging, and "anode" refers to the electrode in which an electrode active material is reduced during charging and oxidized during discharging.

As noted above, the anode can comprise an anode active material. For example, referring to FIG. 1, anode 120 of electrochemical cell 100 comprises an anode active material. In some embodiments, the anode active material comprises lithium (e.g., lithium metal) in solid solution with at least one non-lithium metal. Potential candidates for the at least one non-lithium metal are discussed above.

In some embodiments, the anode active material contains at least 50 wt % lithium. In some cases, the anode active material contains at least 75 wt %, at least 90 wt %, at least 95 wt %, or at least 99 wt % lithium.

In some embodiments, the anode comprises lithium ions which are liberated during discharge and which are integrated (e.g., intercalated) into the anode during charge. In some embodiments, the anode active material is a lithium intercalation compound (e.g., a compound that is capable of reversibly inserting lithium ions at lattice sites and/or interstitial sites). In certain embodiments, the anode active material comprises lithium titanate ($Li_4Ti_5O_{12}$, also referred to as "LTO"), tin-cobalt oxide, or any combinations thereof.

As noted above, the cathode can comprise a cathode active material. For example, referring to FIG. 1, cathode 110 of electrochemical cell 100 comprises a cathode active material. A variety of cathode active materials are suitable for use with cathodes of the electrochemical cells described herein, according to certain embodiments. In some embodiments, the cathode active material comprises a lithium intercalation compound (e.g., a compound that is capable of reversibly inserting lithium ions at lattice sites and/or interstitial sites). In certain cases, the cathode active material comprises a layered oxide. A layered oxide generally refers to an oxide having a lamellar structure (e.g., a plurality of sheets, or layers, stacked upon each other). Non-limiting examples of suitable layered oxides include lithium cobalt oxide ($LiCoO_2$), lithium nickel oxide ($LiNiO_2$), and lithium manganese oxide ($LiMnO_2$). In some embodiments, the layered oxide is lithium nickel manganese cobalt oxide ($LiNi_xMn_yCo_zO_2$, also referred to as "NMC" or "NCM"). In some such embodiments, the sum of x, y, and z is 1. For example, a non-limiting example of a suitable NMC compound is $LiNi_{1/3}Mn_{1/3}Co_{1/3}O_2$. In some embodiments, a layered oxide may have the formula $(Li_2MnO_3)_x$ $(LiMO_2)_{(1-x)}$ where M is one or more of Ni, Mn, and Co. For example, the layered oxide may be $(Li_2MnO_3)_{0.25}$ $(LiNi_{0.3}Co_{0.15}Mn_{0.55}O_2)_{0.75}$. In some embodiments, the layered oxide is lithium nickel cobalt aluminum oxide ($LiNi_xCo_yAl_zO_2$, also referred to as "NCA"). In some such embodiments, the sum of x, y, and z is 1. For example, a non-limiting example of a suitable NCA compound is $LiNi_{0.8}Co_{0.15}Al_{0.05}O_2$. In certain embodiments, the cathode active material is a transition metal polyanion oxide (e.g., a compound comprising a transition metal, an oxygen, and/or an anion having a charge with an absolute value greater than 1). A non-limiting example of a suitable transition metal polyanion oxide is lithium iron phosphate ($LiFePO_4$, also referred to as "LFP"). Another non-limiting example of a suitable transition metal polyanion oxide is lithium manganese iron phosphate ($LiMn_xFe_{1-x}PO_4$, also referred to as "LMFP"). A non-limiting example of a suitable LMFP compound is $LiMn_{0.8}Fe_{0.2}PO_4$. In some embodiments, the cathode active material is a spinel (e.g., a compound having the structure $AB_2O_4$, where A can be Li, Mg, Fe, Mn, Zn, Cu, Ni, Ti, or Si, and B can be Al, Fe, Cr, Mn, or V). A non-limiting example of a suitable spinel is a lithium manganese oxide with the chemical formula $LiM_xMn_{2-x}O_4$ where M is one or more of Co, Mg, Cr, Ni, Fe, Ti, and Zn. In some embodiments, x may equal 0 and the spinel may be lithium manganese oxide ($LiMn_2O_4$, also referred to as "LMO"). Another non-limiting example is lithium manganese nickel oxide ($LiNi_xM_{2-x}O_4$, also referred to as "LMNO"). A non-limiting example of a suitable LMNO compound is $LiNi_{0.5}Mn_{1.5}O_4$. In certain cases, the electroactive material of the second electrode comprises $Li_{1.14}Mn_{0.42}Ni_{0.25}Co_{0.29}O_2$ ("HC-MNC"), lithium carbonate ($Li_2CO_3$), lithium carbides (e.g., $Li_2C_2$, $Li_4C$, $Li_6C_2$, $Li_8C_3$, $Li_6C_3$, $Li_4C_3$, $Li_4C_5$), vanadium oxides (e.g., $V_2O_5$, $V_2O_3$, $V_6O_{13}$), and/or vanadium phosphates (e.g., lithium vanadium phosphates, such as $Li_3V_2(PO_4)_3$), or any combination thereof. In some embodiments, the cathode active material comprises a conversion compound. For instance, the cathode may be a lithium conversion cathode. It has been recognized that a cathode comprising a conversion compound may have a relatively large specific capacity. Without wishing to be bound by a particular theory, a relatively large specific capacity may be achieved by utilizing all possible oxidation states of a compound through a conversion reaction in which more than one electron transfer takes place per transition metal (e.g., compared to 0.1-1 electron transfer in intercalation compounds). Suitable conversion compounds include, but are not limited to, transition metal oxides (e.g., $Co_3O_4$), transition metal hydrides, transition metal sulfides, transition metal nitrides, and transition metal fluorides (e.g., $CuF_2$, $FeF_2$, $FeF_3$). A transition metal generally refers to an element whose atom has a partially filled d sub-shell (e.g., Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, Hs).

In some cases, the cathode active material may be doped with one or more dopants to alter the electrical properties (e.g., electrical conductivity) of the cathode active material. Non-limiting examples of suitable dopants include aluminum, niobium, silver, and zirconium.

In certain embodiments, the cathode active material comprises sulfur. In some embodiments, the cathode active material comprises electroactive sulfur-containing materials. "Electroactive sulfur-containing materials," as used herein, refers to electrode active materials which comprise the element sulfur in any form, wherein the electrochemical activity involves the oxidation or reduction of sulfur atoms or moieties. As an example, the electroactive sulfur-containing material may comprise elemental sulfur (e.g., $S_8$). In some embodiments, the electroactive sulfur-containing material comprises a mixture of elemental sulfur and a sulfur-containing polymer. Thus, suitable electroactive sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electroactive sulfur-containing material within an electrode (e.g., a cathode) comprises at least about 40 wt % sulfur. In some cases, the electroactive sulfur-containing material comprises at least about 50 wt %, at least about 75 wt %, or at least about 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723, 230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

The cathode and/or anode may comprise, as noted above, pores, according to certain embodiments. As used herein, a "pore" refers to a pore as measured using ASTM D6583-00, which measures porosity by oil absorption, and generally refers to a conduit, void, or passageway, at least a portion of which is surrounded by the medium in which the pore is formed such that a continuous loop may be drawn around the pore while remaining within the medium. Generally, voids within a material that are completely surrounded by the material (and thus, not accessible from outside the material, e.g., closed cells) are not considered pores within the context of the invention. It should be understood that, in cases where the article comprises an agglomeration of particles, pores include both the interparticle pores (i.e., those pores defined between particles when they are packed together, e.g., interstices) and intraparticle pores (i.e., those pores lying within the envelopes of the individual particles). Pores may comprise any suitable cross-sectional shape such as, for example, circular, elliptical, polygonal (e.g., rectangular, triangular, etc.), irregular, and the like.

As would be understood by a person of ordinary skill in the art, the porosity of an anode subjected to an anisotropic force, at the time of immediately after the discharge of the tenth cycle and after the electrochemical cell is fully cycled 10 times, may be measured by applying the above-described porosity test after removing the anode from the cell after which it is no longer subjected to the anisotropic force. Because removal of the anode causes no substantial change in the value of the porosity of the anode as compared to when it was subjected to the anisotropic force within the cell, testing the anode by this procedure is indicative of the value of the porosity of the anode while it is incorporated in the cell under an applied anisotropic force.

As noted above, inventive electrochemical cells comprise an electrolyte and/or separator. For example, referring to FIG. 1, electrochemical cell 100 comprises electrolyte 130. The electrolyte may comprise a separator. The electrolytes used in electrochemical or battery cells can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions (e.g., lithium ions) between the anode and the cathode. The electrolyte is electronically non-conductive to prevent short circuiting between the anode and the cathode. In some embodiments, the electrolyte may comprise a non-solid electrolyte.

In some embodiments, the electrolyte comprises a fluid that can be added at any point in the fabrication process. In some cases, the electrochemical cell may be fabricated by providing a cathode and an anode, applying an anisotropic force component normal to the active surface of the anode, and subsequently adding the fluid electrolyte such that the electrolyte is in electrochemical communication with the cathode and the anode. In other cases, the fluid electrolyte may be added to the electrochemical cell prior to or simultaneously with the application of the anisotropic force component, after which the electrolyte is in electrochemical communication with the cathode and the anode.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994). Heterogeneous electrolyte compositions that can be used in batteries described herein are described in U.S. patent application Ser. No. 12/312,764, filed May 26, 2009 and entitled "Separation of Electrolytes," by Mikhaylik et al., which is incorporated herein by reference in its entirety.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

In some cases, aqueous solvents can be used as electrolytes, for example, in lithium cells. Aqueous solvents can include water, which can contain other components such as ionic salts. As noted above, in some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes, i.e., electrolytes comprising one or more polymers forming a semi-solid network. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, polysulfones, polyethersulfones, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, 20-40%, between 60-70%, between 70-80%, between 80-90%, or between 90-95% of a heterogeneous electrolyte by volume.

In some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

Examples of ionic electrolyte salts for use in the electrolytes of the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$, and lithium bis(fluorosulfonyl)imide (LiFSI). Other electrolyte salts that may be useful include lithium polysulfides (Li$_2$S$_x$), and lithium salts of organic polysulfides (LiS$_x$R)$_n$, where x is an integer from 1 to 20, n is an integer from 1 to 3, and R is an organic group, and those disclosed in U.S. Pat. No. 5,538,812 to Lee et al.

In some embodiments, the electrolyte comprises one or more room temperature ionic liquids. The room temperature ionic liquid, if present, typically comprises one or more cations and one or more anions. Non-limiting examples of suitable cations include lithium cations and/or one or more quaternary ammonium cations such as imidazolium, pyrrolidinium, pyridinium, tetraalkylammonium, pyrazolium, piperidinium, pyridazinium, pyrimidinium, pyrazinium, oxazolium, and trizolium cations. Non-limiting examples of suitable anions include trifluromethylsulfonate (CF$_3$SO$_3^-$), bis (fluorosulfonyl)imide (N(FSO$_2$)$_2^-$, bis (trifluoromethyl sulfonyl)imide ((CF$_3$SO$_2$)$_2$N$^-$, bis (perfluoroethylsulfonyl) imide((CF$_3$CF$_2$SO$_2$)$_2$N$^-$ and tris(trifluoromethylsulfonyl) methide ((CF$_3$SO$_2$)$_3$C$^-$. Non-limiting examples of suitable ionic liquids include N-methyl-N-propylpyrrolidinium/bis (fluorosulfonyl) imide and 1,2-dimethyl-3-propylimidazolium/bis(trifluoromethanesulfonyl)imide. In some embodiments, the electrolyte comprises both a room temperature ionic liquid and a lithium salt. In some other embodiments, the electrolyte comprises a room temperature ionic liquid and does not include a lithium salt.

In some embodiments, electrochemical cells may further comprise a separator interposed between the cathode and anode. In some embodiments, the separator may be proximate to the electrolyte. The separator may be a solid non-conductive or insulative material which separates or insulates the anode and the cathode from each other preventing short circuiting, and which permits the transport of ions between the anode and the cathode. In some embodiments, the porous separator may be perrmeable to the electrolyte.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes (e.g., SETELA™ made by Tonen Chemical Corp) and polypropylenes, glass fiber filter papers, and ceramic materials. For example, in some embodiments, the separator comprises a microporous film (e.g., a microporous polyethylene film). Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee. Solid electrolytes and gel electrolytes may also function as a separator in addition to their electrolyte function.

As noted above, in some embodiments, inventive electrochemical cells can be under an applied anisotropic force. In some embodiments, the anisotropic force can be applied such that the magnitude of the force is substantially equal in all directions within a plane defining a cross-section of the electrochemical cell, but the magnitude of the forces in out-of-plane directions is substantially unequal to the magnitudes of the in-plane forces.

In one set of embodiments, cells described herein are constructed and arranged to apply, during at least one period of time during charge and/or discharge of the cell, an anisotropic force with a component normal to the active surface of the anode. Those of ordinary skill in the art will understand the meaning of this. In such an arrangement, the cell may be formed as part of a container which applies such a force by virtue of a "load" applied during or after assembly of the cell, or applied during use of the cell as a result of expansion and/or contraction of one or more portions of the cell itself.

The anisotropic force described herein may be applied using any suitable method known in the art. In some embodiments, the force may be applied using compression springs. For example, referring to FIG. 1, electrochemical cell 100 may be situated in an optional enclosed containment structure 170 with one or more compression springs situated between current collector 180 and/or anode 120 and the adjacent wall of containment structure 170 to produce a force with a component in the direction of arrow 182 to electrodes 110 and 120 and electrolyte 130. In some embodiments, the force may be applied by situating one or more compression springs outside the containment structure such that the spring is located between an outside surface of the containment structure and another surface (e.g., a tabletop, the inside surface of another containment structure, an adjacent cell, etc.). Forces may be applied using other elements (either inside or outside a containment structure) including, but not limited to Belleville washers, machine screws, pneumatic devices, and/or weights, among others. For example, in one set of embodiments, one or more cells (e.g., a stack of cells) are arranged between two plates (e.g., metal plates). A device (e.g., a machine screw, a spring, etc.) may be used to apply pressure to the ends of the cell or stack via the plates. In the case of a machine screw, for example, the cells may be compressed between the plates upon rotating the screw. As another example, in some embodiments, one or more wedges may be displaced between a surface of the cell (or the containment structure surrounding the cell) and a fixed surface (e.g., a tabletop, the inside surface of another containment structure, an adjacent cell, etc.). The anisotropic force may be applied by driving the wedge between the cell and the adjacent fixed surface through the application of force on the wedge (e.g., by turning a machine screw).

The magnitude of the applied force is, in some embodiments, large enough to enhance the performance of the electrochemical cell. An anode active surface and the anisotropic force may be, in some instances, together selected such that the anisotropic force affects surface morphology of the anode active surface to inhibit increase in anode active surface area through charge and discharge and wherein, in the absence of the anisotropic force but under otherwise essentially identical conditions, the anode active surface area is increased to a greater extent through charge and discharge cycles. "Essentially identical conditions," in this context, means conditions that are similar or identical other than the application and/or magnitude of the force. For example, otherwise identical conditions may mean a cell that is identical, but where it is not constructed (e.g., by brackets or other connections) to apply the anisotropic force on the subject cell.

In some embodiments, an anisotropic force with a component normal to an active surface of the anode is applied, to an extent effective to cause the anode to have a porosity of less than 20%, 15%, 10%, 5%, or 1%, when measured after having fully cycled the cell 10 times and immediately after the discharge of the tenth cycle.

In some embodiments, an anisotropic force with a component normal to an active surface of the anode is applied, when the cell is in a fully discharged state, to an extent effective to cause the remaining non-lithium metal component to form a region having a sheet resistance of less than 1000 $\Omega$/sq., 900 $\Omega$/sq., 800 $\Omega$/sq., 700 $\Omega$/sq., 600 $\Omega$/sq., 500 $\Omega$/sq., 400 $\Omega$/sq., 300 $\Omega$/sq., 200 $\Omega$/sq., or 100 $\Omega$/sq.

In some embodiments, an anisotropic force with a component normal to an active surface of the anode is applied, during at least one period of time during charge and/or discharge of the cell, to an extent effective to inhibit an increase in surface area of the anode active surface relative to an increase in surface area absent the anisotropic force. The component of the anisotropic force normal to the anode active surface may, for example, apply a pressure of at least about 4.9, at least about 9.8, at least about 24.5, at least about 49, at least about 78, at least about 98, at least about 117.6, at least about 147, at least about 175, at least about 200, at least about 225, at least about 250, at least about 300, at least about 400, or at least about 500 Newtons per square centimeter. In some embodiments, the component of the anisotropic force normal to the anode active surface may, for example, apply a pressure of less than about 500, less than about 400, less than about 300, less than about 250, less than about 225, less than about 196, less than about 147, less than about 117.6, less than about 98, less than about 49, less than about 24.5, or less than about 9.8 Newtons per square centimeter. Combinations of the above values are also possible. In some cases, the component of the anisotropic force normal to the anode active surface is may apply a pressure of between about 4.9 and about 147 Newtons per square centimeter, between about 49 and about 117.6 Newtons per square centimeter, between about 68.6 and about 98 Newtons per square centimeter, between about 78 and about 108 Newtons per square centimeter, between about 4.9 and about 250 Newtons per square centimeter, between about 49 and about 250 Newtons per square centimeter, between about 80 and about 250 Newtons per square centimeter, between about 90 and about 250 Newtons per square centimeter, or between about 100 and about 250 Newtons per square centimeter. The force or pressure may, in some embodiments, be externally-applied to the cell, as described herein. While forces and pressures are generally described herein in units of Newtons and Newtons per unit area, respectively, forces and pressures can also be expressed in units of kilograms-force ($kg_f$) and kilograms-force per unit area, respectively. One or ordinary skill in the art will be familiar with kilogram-force-based units, and will understand that 1 kilogram-force is equivalent to about 9.8 Newtons.

As described herein, in some embodiments, the surface of an anode can be enhanced during cycling (e.g., for lithium, the development of mossy or a rough surface of lithium may be reduced or eliminated) by application of an externally-applied (in some embodiments, uniaxial) pressure. The externally-applied pressure may, in some embodiments, be chosen to be greater than the yield stress of a material forming the anode. For example, for an anode comprising lithium, the cell may be under an externally-applied anisotropic force with a component defining a pressure of at least about 8 $kg_f/cm^2$, at least about 9 $kg_f/cm^2$, at least about 10 $kg_f/cm^2$, at least about 20 $kg_f/cm^2$, at least about 30 $kg_f/cm^2$, at least about 40 $kg_f/cm^2$, or at least about 50 $kg_f/cm^2$. This is because the yield stress of lithium is around 7-8 $kg_f/cm^2$. Thus, at pressures (e.g., uniaxial pressures) greater than this value, mossy Li, or any surface roughness at all, may be reduced or suppressed. The lithium surface roughness may mimic the surface that is pressing against it. Accordingly, when cycling under at least about 8 $kg_f/cm^2$, at least about 9 $kg_f/cm^2$, or at least about 10 $kg_f/cm^2$, at least about 20 $kg_f/cm^2$, at least about 30 $kg_f/cm^2$, at least about 40 $kg_f/cm^2$, or at least about 50 $kg_f/cm^2$ of externally-applied pressure, the lithium surface may become smoother with cycling when the pressing surface is smooth. As described herein, the pressing surface may be modified by choosing the appropriate material(s) positioned between the anode and the cathode.

In some cases, one or more forces applied to the cell have a component that is not normal to an active surface of an anode. For example, in FIG. 1, force 184 is not normal to active surface 185 of electrode 110. In one set of embodiments, the sum of the components of all applied anisotropic forces in a direction normal to the anode active surface is larger than any sum of components in a direction that is non-normal to the anode active surface. In some embodiments, the sum of the components of all applied anisotropic forces in a direction normal to the anode active surface is at least about 5%, at least about 10%, at least about 20%, at least about 35%, at least about 50%, at least about 75%, at least about 90%, at least about 95%, at least about 99%, or at least about 99.9% larger than any sum of components in a direction that is parallel to the anode active surface.

In some cases, cells may be pre-compressed before they are inserted into containment structures, and, upon being inserted to the containment structure, they may expand to produce a net force on the cell. Such an arrangement may be advantageous, for example, if the cell is capable of withstanding relatively high variations in pressure. In such embodiments, the containment structures may have a relatively high strength (e.g., at least about 100 MPa, at least about 200 MPa, at least about 500 MPa, or at least about 1 GPa). In addition, the containment structure may have a relatively high elastic modulus (e.g., at least about 10 GPa, at least about 25 GPa, at least about 50 GPa, or at least about 100 GPa). The containment structure may comprise, for example, aluminum, titanium, or any other suitable material.

The following applications are incorporated herein by reference, in their entirety, for all purposes: U.S. Patent Publication No. US 2007/0221265, published on Sep. 27, 2007, filed as application Ser. No. 11/400,781 on Apr. 6, 2006, and entitled "Rechargeable Lithium/Water, Lithium/Air Batteries"; U.S. Patent Publication No. US 2009/0035646, published on Feb. 5, 2009, filed as application Ser. No. 11/888,339 on Jul. 31, 2007, and entitled "Swelling Inhibition in Batteries"; U.S. Patent Publication No. US 2010/0129699, published on May 17, 2010, filed as application Ser. No. 12/312,674 on Feb. 2, 2010, patented as U.S. Pat. No. 8,617,748 on Dec. 31, 2013, and entitled "Separation of Electrolytes"; U.S. Patent Publication No. US 2010/0291442, published on Nov. 18, 2010, filed as application Ser. No. 12/682,011 on Jul. 30, 2010, patented as U.S. Pat. No. 8,871,387 on Oct. 28, 2014, and entitled "Primer for Battery Electrode"; U.S. Patent Publication No. US 2009/0200986, published on Aug. 31, 2009, filed as application Ser. No. 12/069,335 on Feb. 8, 2008, patented as U.S. Pat.

No. 8,264,205 on Sep. 11, 2012, and entitled "Circuit for Charge and/or Discharge Protection in an Energy-Storage Device"; U.S. Patent Publication No. US 2007/0224502, published on Sep. 27, 2007, filed as application Ser. No. 11/400,025 on Apr. 6, 2006, patented as U.S. Pat. No. 7,771,870 on Aug. 10, 2010, and entitled "Electrode Protection in Both Aqueous and Non-Aqueous Electrochemical cells, Including Rechargeable Lithium Batteries"; U.S. Patent Publication No. US 2008/0318128, published on Dec. 25, 2008, filed as application Ser. No. 11/821,576 on Jun. 22, 2007, and entitled "Lithium Alloy/Sulfur Batteries"; U.S. Patent Publication No. US 2002/0055040, published on May 9, 2002, filed as application Ser. No. 09/795,915 on Feb. 27, 2001, patented as U.S. Pat. No. 7,939,198 on May 10, 2011, and entitled "Novel Composite Cathodes, Electrochemical Cells Comprising Novel Composite Cathodes, and Processes for Fabricating Same"; U.S. Patent Publication No. US 2006/0238203, published on Oct. 26, 2006, filed as application Ser. No. 11/111,262 on Apr. 20, 2005, patented as U.S. Pat. No. 7,688,075 on Mar. 30, 2010, and entitled "Lithium Sulfur Rechargeable Battery Fuel Gauge Systems and Methods"; U.S. Patent Publication No. US 2008/0187663, published on Aug. 7, 2008, filed as application Ser. No. 11/728,197 on Mar. 23, 2007, patented as U.S. Pat. No. 8,084,102 on Dec. 27, 2011, and entitled "Methods for Co-Flash Evaporation of Polymerizable Monomers and Non-Polymerizable Carrier Solvent/Salt Mixtures/Solutions"; U.S. Patent Publication No. US 2011/0006738, published on Jan. 13, 2011, filed as application Ser. No. 12/679,371 on Sep. 23, 2010, and entitled "Electrolyte Additives for Lithium Batteries and Related Methods"; U.S. Patent Publication No. US 2011/0008531, published on Jan. 13, 2011, filed as application Ser. No. 12/811,576 on Sep. 23, 2010, patented as U.S. Pat. No. 9,034,421 on May 19, 2015, and entitled "Methods of Forming Electrodes Comprising Sulfur and Porous Material Comprising Carbon"; U.S. Patent Publication No. US 2010/0035128, published on Feb. 11, 2010, filed as application Ser. No. 12/535,328 on Aug. 4, 2009, patented as U.S. Pat. No. 9,105,938 on Aug. 11, 2015, and entitled "Application of Force in Electrochemical Cells"; U.S. Patent Publication No. US 2011/0165471, published on Jul. 15, 2011, filed as application Ser. No. 12/180,379 on Jul. 25, 2008, and entitled "Protection of Anodes for Electrochemical Cells"; U.S. Patent Publication No. US 2006/0222954, published on Oct. 5, 2006, filed as application Ser. No. 11/452,445 on Jun. 13, 2006, patented as U.S. Pat. No. 8,415,054 on Apr. 9, 2013, and entitled "Lithium Anodes for Electrochemical Cells"; U.S. Patent Publication No. US 2010/0239914, published on Sep. 23, 2010, filed as application Ser. No. 12/727,862 on Mar. 19, 2010, and entitled "Cathode for Lithium Battery"; U.S. Patent Publication No. US 2010/0294049, published on Nov. 25, 2010, filed as application Ser. No. 12/471,095 on May 22, 2009, patented as U.S. Pat. No. 8,087,309 on Jan. 3, 2012, and entitled "Hermetic Sample Holder and Method for Performing Microanalysis under Controlled Atmosphere Environment"; U.S. Patent Publication No. US 2011/00765560, published on Mar. 31, 2011, filed as application Ser. No. 12/862,581 on Aug. 24, 2010, and entitled "Electrochemical Cells Comprising Porous Structures Comprising Sulfur"; U.S. Patent Publication No. US 2011/0068001, published on Mar. 24, 2011, filed as application Ser. No. 12/862,513 on Aug. 24, 2010, and entitled "Release System for Electrochemical Cells"; U.S. Patent Publication No. US 2012/0048729, published on Mar. 1, 2012, filed as application Ser. No. 13/216,559 on Aug. 24, 2011, and entitled "Electrically Non-Conductive Materials for Electrochemical Cells"; U.S. Patent Publication No. US 2011/0177398, published on Jul. 21, 2011, filed as application Ser. No. 12/862,528 on Aug. 24, 2010, and entitled "Electrochemical Cell"; U.S. Patent Publication No. US 2011/0070494, published on Mar. 24, 2011, filed as application Ser. No. 12/862,563 on Aug. 24, 2010, and entitled "Electrochemical Cells Comprising Porous Structures Comprising Sulfur"; U.S. Patent Publication No. US 2011/0070491, published on Mar. 24, 2011, filed as application Ser. No. 12/862,551 on Aug. 24, 2010, and entitled "Electrochemical Cells Comprising Porous Structures Comprising Sulfur"; U.S. Patent Publication No. US 2011/0059361, published on Mar. 10, 2011, filed as application Ser. No. 12/862,576 on Aug. 24, 2010, patented as U.S. Pat. No. 9,005,009 on Apr. 14, 2015, and entitled "Electrochemical Cells Comprising Porous Structures Comprising Sulfur"; U.S. Patent Publication No. US 2012/0070746, published on Mar. 22, 2012, filed as application Ser. No. 13/240,113 on Sep. 22, 2011, and entitled "Low Electrolyte Electrochemical Cells"; U.S. Patent Publication No. US 2011/0206992, published on Aug. 25, 2011, filed as application Ser. No. 13/033,419 on Feb. 23, 2011, and entitled "Porous Structures for Energy Storage Devices"; U.S. Patent Publication No. 2013/0017441, published on Jan. 17, 2013, filed as application Ser. No. 13/524,662 on Jun. 15, 2012, patented as U.S. Pat. No. 9,548,492 on Jan. 17, 2017, and entitled "Plating Technique for Electrode"; U.S. Patent Publication No. US 2013/0224601, published on Aug. 29, 2013, filed as application Ser. No. 13/766,862 on Feb. 14, 2013, patented as U.S. Pat. No. 9,077,041 on Jul. 7, 2015, and entitled "Electrode Structure for Electrochemical Cell"; U.S. Patent Publication No. US 2013/0252103, published on Sep. 26, 2013, filed as application Ser. No. 13/789,783 on Mar. 8, 2013, patented as U.S. Pat. No. 9,214,678 on Dec. 15, 2015, and entitled "Porous Support Structures, Electrodes Containing Same, and Associated Methods"; U.S. Patent Publication No. US 2013/0095380, published on Apr. 18, 2013, filed as application Ser. No. 13/644,933 on Oct. 4, 2012, patented as U.S. Pat. No. 8,936,870 on Jan. 20, 2015, and entitled "Electrode Structure and Method for Making the Same"; U.S. Patent Publication No. US 2014/0123477, published on May 8, 2014, filed as application Ser. No. 14/069,698 on Nov. 1, 2013, patented as U.S. Pat. No. 9,005,311 on Apr. 14, 2015, and entitled "Electrode Active Surface Pretreatment"; U.S. Patent Publication No. US 2014/0193723, published on Jul. 10, 2014, filed as application Ser. No. 14/150,156 on Jan. 8, 2014, patented as U.S. Pat. No. 9,559,348 on Jan. 31, 2017, and entitled "Conductivity Control in Electrochemical Cells"; U.S. Patent Publication No. US 2014/0255780, published on Sep. 11, 2014, filed as application Ser. No. 14/197,782 on Mar. 5, 2014, patented as U.S. Pat. No. 9,490,478 on Nov. 6, 2016, and entitled "Electrochemical Cells Comprising Fibril Materials"; U.S. Patent Publication No. US 2014/0272594, published on Sep. 18, 2014, filed as application Ser. No. 13/833,377 on Mar. 15, 2013, and entitled "Protective Structures for Electrodes"; U.S. Patent Publication No. US 2014/0272597, published on Sep. 18, 2014, filed as application Ser. No. 14/209,274 on Mar. 13, 2014, and entitled "Protected Electrode Structures and Methods"; U.S. Patent Publication No. US 2014/0193713, published on Jul. 10, 2014, filed as application Ser. No. 14/150,196 on Jan. 8, 2014, patented as U.S. Pat. No. 9,531,009 on Dec. 27, 2016, and entitled "Passivation of Electrodes in Electrochemical Cells"; U.S. Patent Publication No. US 2014/0272565, published on Sep. 18, 2014, filed as application Ser. No. 14/209,396 on Mar. 13, 2014, and entitled "Protected Electrode Structures"; U.S. Patent Publication No. US 2015/0010804, published on Jan. 8, 2015, filed as application Ser. No. 14/323,269 on Jul. 3, 2014, and entitled "Ceramic/Polymer Matrix for Electrode Protection in Electrochemical Cells, Including Rechargeable Lithium Batteries"; U.S. Patent Publication No. US 2015/0044517, published on Feb. 12, 2015, filed as application Ser. No. 14/455,230 on Aug. 8, 2014, and entitled "Self-Healing Electrode Protection in Electrochemical Cells"; U.S. Patent Publication No. US 2015/0236322, published on Aug. 20, 2015, filed as application Ser. No. 14/184,037 on Feb. 19, 2014, and entitled "Electrode Protection Using Electrolyte-Inhibiting Ion Conductor"; and U.S. Patent Publication No. US 2016/0072132, published on Mar. 10, 2016, filed as application Ser. No. 14/848,659 on Sep. 9, 2015, and entitled "Protective Layers in Lithium-Ion Electrochemical Cells and Associated Electrodes and Methods".

U.S. Provisional Application No. 62/517,409, filed Jun. 9, 2017, and entitled "In Situ Current Collector" is incorporated herein by reference in its entirety for all purposes.

EXAMPLES

The following examples are intended to illustrate certain embodiments of the present invention, but do not exemplify the full scope of the invention.

In the following examples and comparative examples, the cells were prepared by the following methods. For the examples incorporating non-limiting embodiments of the disclosed invention, an anode was made of a 2 mil Li/Mg solid solution. For the comparative examples an anode was made of a conventional 2 mil Li foil. The cathodes used in both the examples and comparative examples were lithium cobalt oxide (LCO) cathodes. The porous separator used in both the examples and comparative examples was 25 µm polyolefin (Celgard 2325). The above components were assembled to form electrochemical cells in a stacked layer structure of cathode/separator/anode/separator/cathode, with an active cathode material loading of 21 mg/cm²/per side. The total active surface area of each cell was 16.6 cm². After sealing the cell components in a foil pouch, 0.3 mL of LP30 electrolyte from BASF [1M lithium hexafluorophosphate (LiPF$_6$) in a 1:1 weight ratio mixture of dimethyl carbonate (DMC) and ethylene carbonate (EC)] was added. The cell package was then vacuum sealed. These cells were allowed to soak in the electrolyte for 24 hours unrestrained and then 10 kg/cm² pressure was applied. All the cells were cycled under such pressure. Charge and discharge cycling was performed at standard C/8 (12.5 mA) and C/5 rate (20 mA), respectively, with a charge cutoff voltage of 4.2 V or 4.3 V followed by taper at 4.2 V or 4.3 V to 1 mA, and discharge cutoff at 2.5 V. Cell charge/discharge cycling was repeated until cells in a charged state reached only an 80% capacity of their original capacity. The number of cycles it took to reach this reduced-capacity state was observed.

Example 1

A 2 mil thick anode comprising a Li/Mg solid solution, according to an embodiment of the invention, was incorporated in an electrochemical cell manufactured and operated according to the conditions described above. The charge voltage cut-off was 4.2 V.

Example 2

A 2 mil thick anode comprising a Li/Mg solid solution, according to an embodiment of the invention, was incorporated in an electrochemical cell manufactured and operated according to the conditions described above. The charge voltage cut-off was 4.3 V.

Comparative Example 1

In the first comparative example, a conventional 2 Mil Li foil was used as the anode in an electrochemical cell manufactured and operated according to the conditions described above. The charge voltage cut-off was 4.2 V.

Comparative Example 2

In the second comparative example a conventional 2 Mil Li foil was used as the anode in an electrochemical cell manufactured and operated according to the conditions described above. The charge voltage cut-off was 4.3 V.

Results

As shown in Table 1, the use of Li/Mg solid solution as anode, example 1 and 2 showed significant improvement in cycle life over that comparative examples.

TABLE 1

Cycle performances of examples and comparative examples:

|  | #Cycles to 80% Capacity |
| --- | --- |
| Example 1 | 72 |
| Example 2 | 76 |
| Comparative Example 1 | 29 |
| Comparative Example 2 | 28 |

As shown in Table 1, the electrochemical cells of Examples 1 and 2, which incorporated an anode comprising a lithium magnesium solid solution, were able to be cycled 72 and 76 times, respectively, before their capacity in a discharged state was reduced to 80% of their original capacity. In contrast, the electrochemical cells of Comparative Examples 1 and 2 were reduced to 80% of their original capacity after 29 and 28 cycles, respectively. These trials indicate an improved performance resulting from the use of the disclosed solid solution anodes.

Figure 3A:
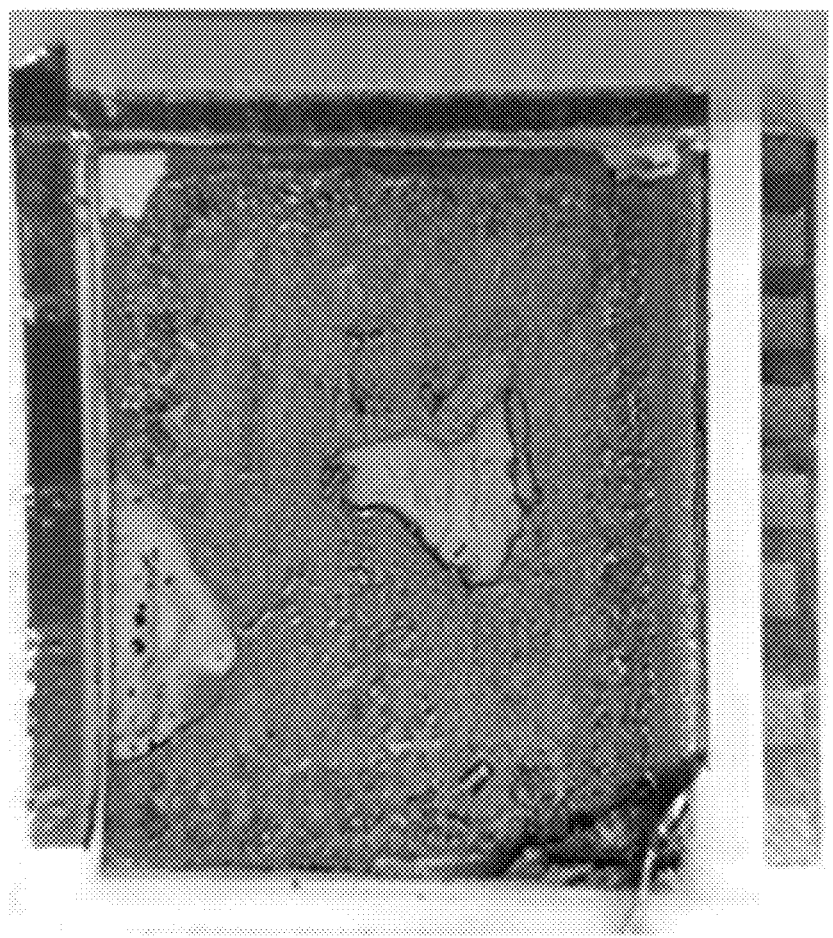
FIG. 3A shows an image of a comparative electrochemical cell at the end of a life cycle.
Figure 3B:
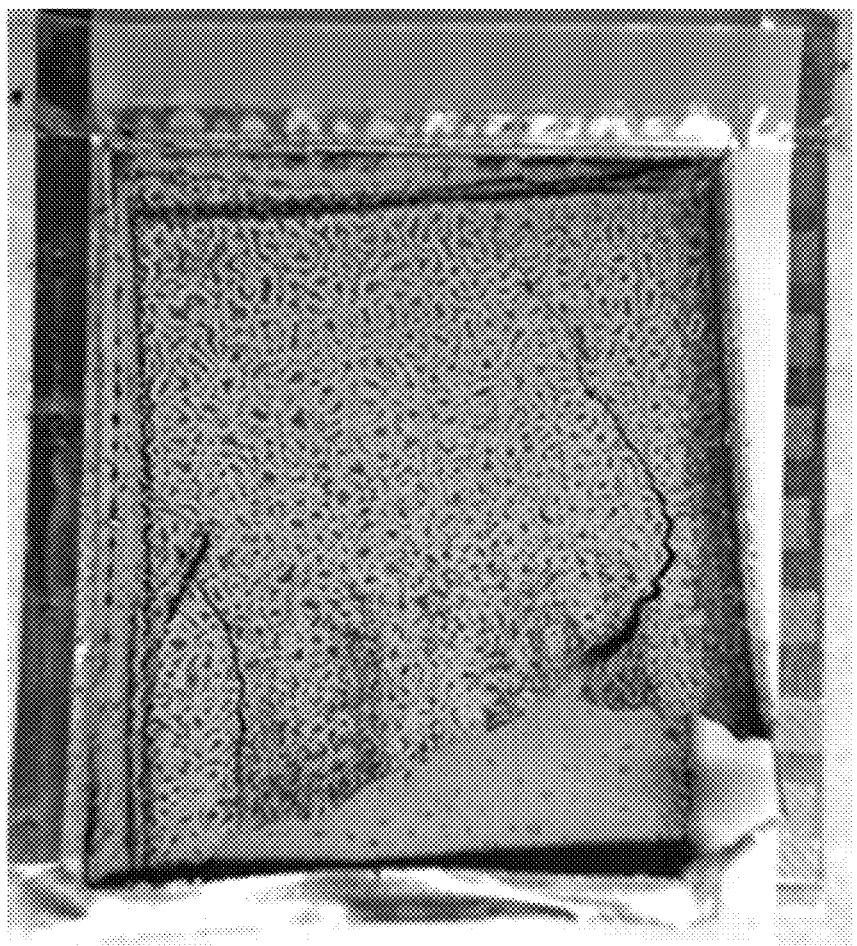
FIG. 3B shows an image of an electrochemical cell, according to an embodiment of the invention, at the end of a life cycle.

Furthermore, the end-of-life cells were opened to examine the integrity of Li and Li/Mg solid solution. FIG. 3A shows an optical image of the electrochemical cell of comparative example 1, in which a conventional lithium anode was employed. It can be clearly observed that the lithium is flaky and loss of connections in many localized areas. FIG. 3B shows an optical image of the electrochemical cell of Example 1, in which an anode comprising a Li/Mg solid solution, according to an embodiment of the invention, was incorporated. FIG. 3B shows that the Li/Mg solid solution remained as an intact sheet.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

For the purpose of clarity, it should be understood that when reference is made to the electrochemical cell or a component of the cell (e.g., an anode) having a certain characteristic (such as a certain porosity or sheet resistance) when measured at a specific point in the life cycle of the cell (e.g. immediately after the discharge of the tenth cycle), such a reference constitutes a screening test for measuring a characteristic of the cell (or other claimed apparatus). Screening tests within a claim should be interpreted such that an apparatus (e.g., electrochemical cell) should be understood to meet the limitation recited in the screening test, where the apparatus would possess the recited characteristic (e.g., porosity, sheet resistance) upon being subjected to the screening test, even if the apparatus has not yet been subjected to the screening test, or otherwise has not reached the described point in the life cycle at which the test is to take place.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell comprising:
   a cathode;
   an anode comprising a solid solution of lithium and at least one non-lithium metal, the anode having an active surface; and
   an electrolyte in electrochemical communication with the cathode and the anode;
   wherein:
   the electrochemical cell is configured such that it is in a charged state when it is first assembled;
   the electrochemical cell is under an applied anisotropic force having a force component normal to the active surface of the anode; and
   the anisotropic force and the electrochemical cell are configured such that, when the electrochemical cell is fully cycled 10 times, the anode has a porosity of less than 20% immediately after the discharge of the tenth cycle, and 75 wt % or less of the amount of lithium present in the anode in its initial fully-charged state remains in the anode immediately after the discharge of the tenth cycle.

2. The electrochemical cell of claim 1, wherein, when the cell is in a fully-charged state, the solid solution has a yield strength of from about 0.1 MPa to about 100 MPa.

3. The electrochemical cell of claim 1, wherein the at least one non-lithium metal is selected from the group consisting of magnesium, zinc, lead, tin, platinum, gold, aluminum, cadmium, silver, mercury, and combinations thereof.

4. The electrochemical cell of claim 1, wherein the at least one non-lithium metal is selected from the group consisting of magnesium, zinc, lead, platinum, gold, cadmium, silver, mercury, and combinations thereof.

5. The electrochemical cell of claim 1, wherein the at least one non-lithium metal excludes the group consisting of silicon, germanium, tin, antimony, bismuth, and aluminum.

6. The electrochemical cell of claim 1, wherein the at least one non-lithium metal comprises magnesium.

7. The electrochemical cell of claim 1, wherein the at least one non-lithium metal in the anode is at least 0.1 wt % and equal to or less than 25 wt % of the combined weight of lithium and non-lithium metal in the anode during a fully charged state.

8. The electrochemical cell of claim 1, wherein the at least one non-lithium metal in the anode is at least 0.1 wt % and equal to or less than 25 wt % of the combined weight of lithium and non-lithium metal in the anode, as assembled.

9. The electrochemical cell of claim 1, wherein the at least one non-lithium metal is selected such that less than about 10 wt % of the at least one non-lithium metal participates in an electrochemical reaction during a first charge and discharge cycle of the cell operating within a voltage window of from about 0 V to about 5 V.

10. The electrochemical cell of claim 1, wherein the at least one non-lithium metal forms a solid solution with lithium at a temperature of between −40° C. and 80° C.

11. The electrochemical cell of claim 1, wherein the electrochemical cell is capable of being cycled at least 70 times before a capacity of the electrochemical cell in a charged state is reduced to less than 80% of an original charge capacity.

12. The electrochemical cell of claim 1, wherein the anisotropic force is configured such that the force component normal to the active surface of the anode applies a pressure to the active surface of the anode of at least about 4.9 and less than about 500 Newtons per square centimeter.

13. The electrochemical cell of claim 1, further comprising a separator proximate to the electrolyte.

14. The electrochemical cell of claim 13, wherein the separator comprises a microporous film.

15. The electrochemical cell of claim 1, wherein, when the electrochemical cell is fully cycled 10 times, the anode has a sheet resistance of less than 1000 Ω/sq. immediately after the discharge of the tenth cycle.

16. The electrochemical cell of claim 1, wherein, when the electrochemical cell is fully cycled 10 times, the anode has a sheet resistance of less than 900 Ω/sq. immediately after the discharge of the tenth cycle.

17. The electrochemical cell of claim 1, wherein, when the electrochemical cell is fully cycled 10 times, the anode has a porosity of less than 15% immediately after the discharge of the tenth cycle.

18. An electrochemical cell comprising:
a cathode;
an anode comprising a solid solution of lithium and at least one non-lithium metal, the anode having an active surface; and
an electrolyte in electrochemical communication with the cathode and the anode;
wherein:
the electrochemical cell is configured such that it is in a charged state when it is first assembled;
the electrochemical cell is under an applied anisotropic force having a force component normal to the active surface of the anode; and
the at least one non-lithium metal is present at a sufficient volume such that, when the electrochemical cell is fully cycled 10 times, the anode has a porosity of less than 20% immediately after the discharge of the tenth cycle, and 75 wt % or less of the amount of lithium present in the anode in its initial fully-charged state remains in the anode immediately after the discharge of the tenth cycle.

19. An electrochemical cell comprising:
a cathode;
an anode comprising a solid solution of lithium and at least one non-lithium metal, the anode having an active surface; and
an electrolyte in electrochemical communication with the cathode and the anode;
wherein:
the electrochemical cell is configured such that it is in a charged state when it is first assembled;
the electrochemical cell is under an applied anisotropic force having a force component normal to the active surface of the anode; and
the anisotropic force and the electrochemical cell are configured such that, when the electrochemical cell is fully cycled 10 times, the anode has a sheet resistance of less than 1000 Ω/sq. immediately after the discharge of the tenth cycle, and 75 wt % or less of the amount of lithium present in the anode in its initial fully-charged state remains in the anode immediately after the discharge of the tenth cycle.

20. The electrochemical cell of claim 19, wherein, when the electrochemical cell is fully cycled 10 times, the anode has a porosity of less than 20% immediately after the discharge of the tenth cycle.

* * * * *